United States Patent
Yoshitomi et al.

(10) Patent No.: US 7,508,851 B2
(45) Date of Patent: Mar. 24, 2009

(54) CLOCK TRANSFER DEVICE

(75) Inventors: Dai Yoshitomi, Tsukuba (JP); Yohei Kobayashi, Tsukuba (JP); Kenji Torizuka, Tsukuba (JP)

(73) Assignee: National Institute of Advanced Industrial Science and Technology (JP)

( * ) Notice: Subject to any disclaimer, the term of this patent is extended or adjusted under 35 U.S.C. 154(b) by 0 days.

(21) Appl. No.: 11/748,172

(22) Filed: May 14, 2007

(65) Prior Publication Data

US 2007/0263681 A1   Nov. 15, 2007

(30) Foreign Application Priority Data

May 15, 2006   (JP)   ............... 2006-135156

(51) Int. Cl.
H01S 3/10   (2006.01)
(52) U.S. Cl. ............... 372/25; 372/18; 372/30
(58) Field of Classification Search .......... 372/18, 372/25, 30
See application file for complete search history.

(56) References Cited

U.S. PATENT DOCUMENTS

| | | | |
|---|---|---|---|
| 4,685,111 A | 8/1987 | Baer | 372/18 |
| 5,367,529 A | 11/1994 | Holsinger et al. | 372/30 |
| 5,828,680 A * | 10/1998 | Kim et al. | 372/18 |
| 5,933,440 A | 8/1999 | Endo et al. | 372/22 |
| 6,333,942 B1 | 12/2001 | Nakazawa et al. | 372/25 |
| 6,628,684 B2 | 9/2003 | Kobayashi et al. | 372/38.1 |
| 6,687,270 B1 | 2/2004 | Robertson, III | 372/18 |
| 6,831,935 B2 | 12/2004 | Ye et al. | 372/18 |
| 2005/0271094 A1* | 12/2005 | Miller et al. | 372/25 |
| 2007/0091941 A1 | 4/2007 | Mori et al. | 372/18 |

FOREIGN PATENT DOCUMENTS

| | | |
|---|---|---|
| JP | 8-321652 | 12/1996 |
| JP | 09-008741 | 1/1997 |
| JP | 2735039 | 1/1998 |
| JP | 22735039 | 1/1998 |
| JP | 11-4037 | 1/1999 |
| JP | 11-145554 | 5/1999 |
| JP | 3276094 | 2/2002 |
| JP | 3350874 | 9/2002 |
| JP | 3351212 | 9/2002 |
| JP | 2002-335055 | 11/2002 |
| JP | 3441938 | 6/2003 |

(Continued)

OTHER PUBLICATIONS

"Standards of Time and Frequency at the Outset of the 21$^{St}$ Century," no date provided.

(Continued)

*Primary Examiner*—Dung T Nguyen
(74) *Attorney, Agent, or Firm*—Ostrolenk, Faber, Gerb & Soffen, LLP

(57) ABSTRACT

A clock transfer device is designed to perform long-distance transfer of a reference clock, which is generated based on a high-precision frequency standard, toward a remote place. The clock transfer device includes a first mode-locked laser for generating a first optical pulse train having a first repetition frequency and a first wavelength, and a second mode-locked laser for generating a second optical pulse train having a second repetition frequency and a second wavelength. The first optical pulse train is introduced into a resonator of the second mode-locked laser via a wavelength multiplexing coupler so that the second repetition frequency is passively synchronized with the first repetition frequency; then, the second optical pulse train is transmitted via a single mode fiber.

16 Claims, 21 Drawing Sheets

FOREIGN PATENT DOCUMENTS

| | | |
|---|---|---|
| JP | 2003-332658 | 11/2003 |
| JP | 3504592 | 12/2003 |
| JP | 2004-006434 | 1/2004 |
| JP | 3575653 | 7/2004 |
| JP | 3629515 | 12/2004 |
| JP | 2005-159118 | 6/2005 |
| JP | 2007-173958 | 7/2007 |
| WO | WO 2005/076422 | 8/2005 |

OTHER PUBLICATIONS

"An optical clock based on a single trapped 199Hg+Ion".

"Precise frequency transfer through a fiber network by use of 1.5μm mode-locked sources".

"An optical clock based on a single trapped 199Hg+Ion," no date provided.

"Ultralow-jitter, 1550-nm mode-locked semiconductor laser synchronized to a visible optical frequency standard," no date provided.

Office Action mailed Jul. 4, 2008 in corresponding Japanese Patent Application No. 2006-135156, with English translation of relevant portion thereof.

Office Action issued Nov. 11, 2008 for counterpart Japanese Patent Application No. 2006-135156, with English translation.

K. Smith et al., "All-Optical Clock Recovery Using a Mode-Locked Laser", Electronics Letters, IEEE, Sep. 10, 1992, vol. 28, No. 19, pp. 1814-1816.

* cited by examiner

US 7,508,851 B2

CLOCK TRANSFER DEVICE

BACKGROUND OF THE INVENTION

1. Field of the Invention

The present invention relates to clock transfer devices, which are used in communication and measurement fields in particular and which perform long-distance transfer of reference frequency clock signals generated based on high-precision frequency standards in the form of optical pulse trains toward remote places.

This application claims priority on Japanese Patent Application No. 2006-135156, the content of which is incorporated herein by reference.

2. Description of the Related Art

Present frequency standards are determined based on microwaves (whose frequencies are below $10^{10}$ Hz) resonating transitions of cesium atoms. The next-generation high-precision frequency standard is developed based on optical transition of cooling atoms realizing higher frequencies instead of microwave transition. The frequency precision depends upon $\Delta f/f$ where f (Hz) denotes transition frequency, and $\Delta f$ (Hz) denotes frequency uncertainty; hence, it is possible to improve the precision of the frequency standard by use of a transition of higher frequencies. By way of the resonation of the optical frequency of a frequency-stabilized laser with the atomic transition, it is possible to use light for the high-precision frequency standard. Since the optical frequency reaches $10^{15}$ Hz, it is very difficult for the existing electric circuitry to process the light because of its high-speed performance; hence, it is very difficult for the existing electric circuitry to perform counting.

For the aforementioned reason, mode-locked lasers (or mode synchronized lasers), which output pulse strings at certain time intervals, have been developed and used for performing counting. As shown in FIG. 1, the mode-locked laser forms longitudinal-mode lines aligned with the equal spacing therebetween on the frequency axis; and this is called a frequency comb. The interval of the frequency comb is identical to the repetition frequency of the pulse train (i.e., the reciprocal of time interval) and is represented by an equation (1), where fn (Hz) denotes a single longitudinal-mode frequency of the frequency comb, and fr (Hz) denotes repetition frequency.

$$fn = n\, fr + fo \quad (1)$$

In the above, n is an integer, and fo is an offset frequency of the frequency comb whose frequency is virtually extended toward zero.

First, the frequency comb is stabilized such that the offset frequency becomes zero or becomes identical to a prescribed value; then, the repetition frequency is controlled such that a single longitudinal-mode frequency of the frequency comb becomes identical to the optical frequency of a laser whose frequency is stabilized due to optical transition of cooling atoms. In this state, since the repetition frequency is approximately $10^9$ Hz, it is easy for the electric circuitry to perform counting. According to the equation (1), the repetition frequency precision directly reflects the precision of atomic transition frequency; hence, the pulse train generated by a mode-locked laser at certain time intervals between pulses can be used for a reference clock having the high precision of the atomic transition standard. For example, when the optical transition frequency is set to 500 THz (where n=500000), and the offset frequency is stabilized at zero, it is possible to realize a reference clock whose repetition frequency is 1 GHz. This is taught in the paper entitled "Standards of Time and Frequency at the Outset of the 21st Century" written by S. A. Diddams et al on p.p. 1318-1324 of 19 Nov. 2004 VOL 36 SCIENCE.

The aforementioned frequency comb whose frequency is stabilized due to atomic transition can be used as a high-precision scale in the frequency axis in absolute frequency measurement. Suppose that there occurs a beam having unknown optical frequency. When the beam is overlapped with the frequency comb, it is possible to detect a beat signal whose frequency substantially matches the frequency difference between the unknown optical frequency and the longitudinal-mode frequency of the frequency comb. The electric circuitry is used to measure a beat frequency fb (Hz), thus allowing the unknown optical frequency f (Hz) to be calculated in accordance with an equation (2).

$$f = n\, fr + fo + fb \quad (2)$$

In order to set the offset frequency to zero, or in order to stabilize offset frequency at a certain value, it is necessary for the spectrum band of a mode-locked laser to be broader than one octave (where the double frequency of the low-limit frequency of the spectrum substantially matches the high-limit frequency). Generally speaking, this is a very difficult problem. At the present, only the titanium-sapphire laser is known as a mode-locked laser that can stabilize the offset frequency at a high precision and that can generate reference clock signals or reference frequency combs based on the atomic frequency standard. This is taught in the paper entitled "An Optical Clock Based on a Single Trapped $^{199}$H$^+$ Ion" written by S. A. Diddams et al on pp. 825-828 of SCIENCE VOL 293 Aug. 3, 2001.

In order to perform high-precision measurement at a remote place by use of the aforementioned reference clock, it is necessary to perform long-distance transfer of the reference clock. There are provided two methods for the reference clock transfer, i.e., a first method in which a continuous wave optical source is subjected to amplitude modulation based on the reference clock and is then subjected to transfer via an optical fiber network, and a second method in which an optical pulse train generated by a mode-locked laser is directly subjected to transfer via an optical fiber network. Herein, the second method realizes a one-digit higher precision in transfer. This is taught in the paper entitled "Precise frequency transfer through a fiber network by use of 1.5-μm mode-locked sources" written by Kevin W. Holman et al on p.p. 1554-1556 of OPTICS LETTERS, Vol. 29, No. 13, Jul. 1, 2004.

In order to realize transfer of an optical pulse train using quartz fibers, it is necessary to select 1.5 μm wavelength presenting a small transfer loss. At the present, only the titanium-sapphire laser of 800 nm wavelength is known as a mode-locked laser that can supply the frequency standard stabilized as the atomic frequency. A laser of 1.5 μm band may be used for a trial but cannot be used because of technological difficulty. There is reported another technology in which the repetition frequency of a mode-locked laser of 1.5 μm wavelength is actively controlled using an electronic circuit so as to establish synchronization with a reference clock. However, this technology needs a complex electronic control circuit, and it suffers from the occurrence of timing jitters having several tens of femtoseconds due to the operation speed limit of the electronic circuit. This is taught in the paper entitled "Ultralow-jitter, 1550-nm mode-locked semiconductor laser synchronized to a visible optical frequency standard" written by David J. Jones et al on p.p. 813-815 of OPTICS LETTERS, Vol. 28, No. 10, May 15, 2003. This technology realizes only the repetition frequency transfer, whereas the offset frequency is not stabilized; hence, it is very difficult to transfer a frequency comb synchronized with a reference frequency.

SUMMARY OF THE INVENTION

It is an object of the present invention to provide a clock transfer device that can realize long-distance transfer of a reference clock generated based on a high-precision frequency standard toward a remote place.

In a first aspect of the present invention, a clock transfer device includes a first mode-locked laser for generating a first optical pulse train having a first repetition frequency and a first wavelength, a second mode-locked laser for generating a second optical pulse train having a second repetition frequency and a second wavelength, an optical introduction means (e.g., a wavelength multiplexing coupler) for introducing the first optical pulse train into a resonator of the second mode-locked laser, and an optical transmission means (e.g., a single mode fiber) for transmitting the second optical pulse train output from the second mode-locked laser, wherein the second repetition frequency is passively synchronized with the first repetition frequency.

In the above, an N multiple (where N is an integer) of the second repetition frequency is passively synchronized with an M multiple (where M is an integer) of the first repetition frequency. Alternatively, a longitudinal-mode frequency of a frequency comb of the second optical pulse train is passively synchronized with a longitudinal-mode frequency of a frequency comb of the first optical pulse train. Herein, N longitudinal-mode frequencies of the frequency comb of the second optical pulse train are each passively synchronized with M longitudinal-mode frequencies of the frequency comb of the first optical pulse train. In addition, it is possible to additionally arrange a wavelength filter for selecting a prescribed component of the first optical pulse train whose wavelength is identical to an oscillated wavelength of the resonator of the second mode-locked laser between the first mode-locked laser and the optical introduction means. Furthermore, it is possible to additionally arrange a wavelength broadening device for performing a wavelength broadening operation so as to broaden the first wavelength range of the first optical pulse train.

In a second aspect of the present invention, a clock transfer device includes a first mode-locked laser for generating a first optical pulse train having a first repetition frequency and a first wavelength, a second mode-locked laser for generating a second optical pulse train having a second repetition frequency and a second wavelength, a medium that is arranged in a resonator of the second mode-locked laser and that shares an optical path suited to the first optical pulse train, and an optical transmission means (e.g., a single mode fiber) for transmitting the second optical pulse train output from the second mode-locked laser, wherein the second repetition frequency is passively synchronized with the first repetition frequency.

In the above, an N multiple (where N is an integer) of the second repetition frequency is passively synchronized with an M multiple (where M is an integer) of the first repetition frequency. Alternatively, a longitudinal-mode frequency of a frequency comb of the second optical pulse train is passively synchronized with a longitudinal-mode frequency of a frequency comb of the first optical pulse train. Herein, N longitudinal-mode frequencies of the frequency comb of the second optical pulse train are each passively synchronized with M longitudinal-mode frequencies of the frequency comb of the first optical pulse train. In addition, it is possible to additionally arrange a wavelength filter for selecting a prescribed component of the first optical pulse train whose wavelength is identical to an oscillated wavelength of the resonator of the second mode-locked laser between the first mode-locked laser and the medium. Furthermore, it is possible to additionally arrange a wavelength broadening device for performing a wavelength broadening operation so as to broaden the first wavelength range.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENTS

Figure 1:
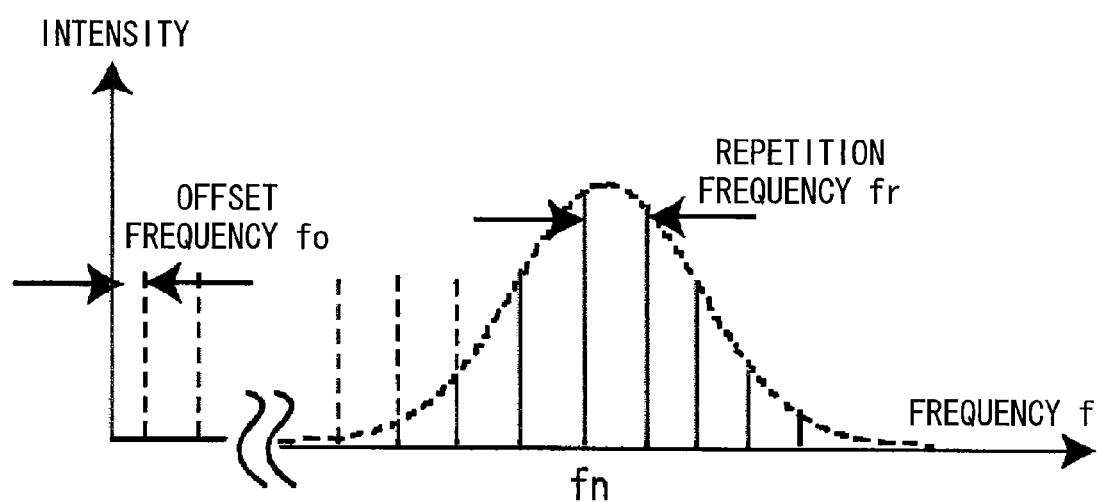
FIG. 1 is a graph showing longitudinal-mode lines aligned on a frequency axis with the equal spacing therebetween in a mode-locked laser.

The present invention will be described in further detail by way of examples with reference to the accompanying drawings.

Before specifically describing the details of the embodiments, the outline of the present invention will be described. The present invention is basically design to use a first mode-locked laser (e.g., a titanium-sapphire laser) for generating a first clock and a second mode-locked laser (e.g., erbium fiber laser), wherein a first optical pulse train generated by the first mode-locked laser is introduced into a resonator of the second mode-locked laser. A second optical pulse train generated by the second mode-locked laser is subjected to spectrum transition due to nonlinear effect caused by the first optical pulse train in the resonator, so that the repetition frequency of the second optical pulse train is passively synchronized with the repetition frequency of the first optical pulse train so as to substantially match the reference clock. That is, by use of optical effects only, it is possible to realize a high-precision clock transfer whose precision is one-digit higher than the conventionally-known precision by suppressing timing jitters due to the operation speed of an electronic circuit conventionally used. The second optical pulse train that is synchronized to match the reference clock is transferred to a remote place via an optical transmission network.

In addition, it is possible to arrange a medium serving as an optical path of the first optical pulse train generated by the first mode-locked laser in the resonator of the second mode-locked laser, whereby the second optical pulse train generated by the second mode-locked laser is subjected to spectrum transition due to a nonlinear effect caused by the first optical pulse train in the medium, so that the repetition frequency of the second optical pulse train is passively synchronized with the repetition frequency of the first optical pulse train so as to substantially match the reference clock. Thus, by use of optical effects only, it is possible to realize a high-precision clock transfer whose precision is one-digit higher than the conventionally-known precision by suppressing timing jitters due to the operation speed of an electronic circuit conventionally used. The second optical pulse train that is synchronized to match the reference clock is transferred to a remote place via an optical transmission means.

Furthermore, it is possible to broaden the wavelength range of the first optical pulse train of the first mode-locked laser by use of a wavelength broadening means so that the first optical pulse train overlaps the second optical pulse train in terms of the wavelength range, whereby the longitudinal-mode frequency of the frequency comb of the second optical pulse train is passively synchronized with and substantially matches the longitudinal-mode frequency of the frequency comb of the first optical pulse train. Then, the second optical pulse train is transferred to a remote place via an optical transmission means.

1. First Embodiment

Next, a clock transfer device according to a first embodiment of the present invention will be described with reference to FIG. 2 and FIGS. 3A to 3F.

Figure 2:
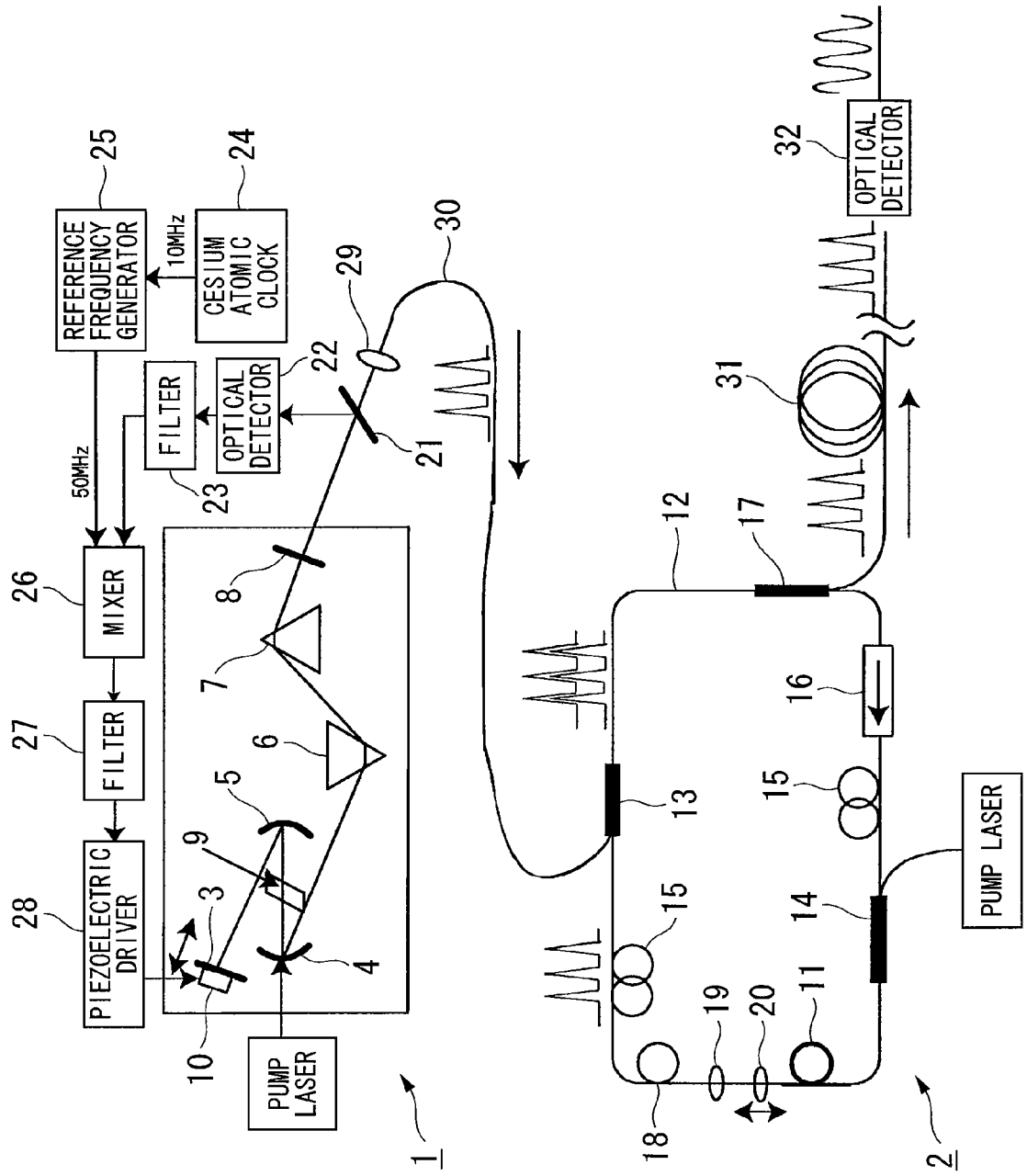
FIG. 2 is a system diagram showing the constitution of a clock transfer device in accordance with a first embodiment of the present invention.

In FIG. 2, a 1.3 µm wavelength chrome-forsterite laser 1 serves as the first mode-locked laser forming the reference clock, and a 1.5 µm wavelength erbium fiber laser 2 serves as the second mode-locked laser. The first mode-locked laser includes a resonator, which is constituted of a mirror 3, concave mirrors 4 and 5, prisms 6 and 7, and an output mirror 8, and a chrome-forsterite crystal 9 serving as a laser medium. One pair of the prisms 6 and 7 compensates for the dispersion of laser beams in the resonator and is used to generate a mode-locked pulse train (or a mode-synchronized pulse train). The mirror 3 is mounted on a moving stage (not shown) and is used to adjust a resonator length. A piezoelectric element 10 is attached to the backside of the mirror 3 so as to realize fine adjustment of the resonator length. The second mode-locked laser has a ring resonator that is constituted of an erbium-doped fiber 11, a quartz fiber 12, wavelength-multiplexing couplers 13 and 14, a polarization controller 15, an isolator 16, an output coupler 17, a fiber expander 18, lenses 19 and 20, and a moving stage (not shown). It is possible to realize fine adjustment or a rough adjustment with respect to a resonator length by means of the fiber expander 18 and the moving stage. Both of the resonators included in the first mode-locked laser and the second mode-locked laser are designed with substantially the same circumferential optical path length, whereby they have substantially the same repetition frequency of 50 MHz.

The first optical pulse train output from the first mode-locked laser is divided by means of a beam splitter 21 so that a prescribed part of the first optical pulse train is detected by an optical detector 22 and is then supplied to a filter 23 so as to extract a repetition frequency component therefrom. Then, a mixer 26 compares the repetition frequency component with a reference frequency of 50 MHz, which is generated by a reference frequency generator 25 based on a signal of 10 MHz generated by a cesium atomic clock 24. The mixer 26 produces an error signal, which is subjected to shaping in a filter 27 and is then applied to the piezoelectric element 10 via a piezoelectric driver 28, whereby the repetition frequency of the first optical pulse train (output from the first mode-locked laser) is reliably synchronized with the reference signals of 50 MHz. The repetition frequency of the second optical pulse train (output from the second mode-locked laser) is adjusted in advance to substantially match the repetition frequency of the first optical pulse train (output from the first mode-locked laser) by means of the aforementioned means for adjusting the resonator wavelength.

For the sake of convenience, the first optical pulse train will be referred to as a primary pulse, and the second optical pulse train will be referred to as a secondary pulse as necessary. The first optical pulse train having the repetition frequency of 50 MHz, which is output from the first mode-locked laser via the output mirror 8 of the resonator, is introduced into a single mode fiber 30 via a lens 29. The single mode fiber 30 is connected to the ring resonator of the second mode-locked laser via the wavelength-multiplexing coupler 13 for multiplexing 1.3-μm beam and 1.5-μm beam, whereby the primary pulse is introduced into the ring resonator.

Figure 3A:
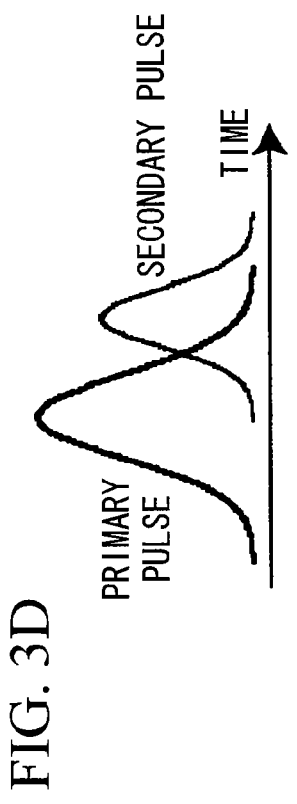
FIG. 3A is a graph diagrammatically showing that a secondary pulse progresses in time rather than a primary pulse while partially overlapping with the primary pulse.
Figure 3B:
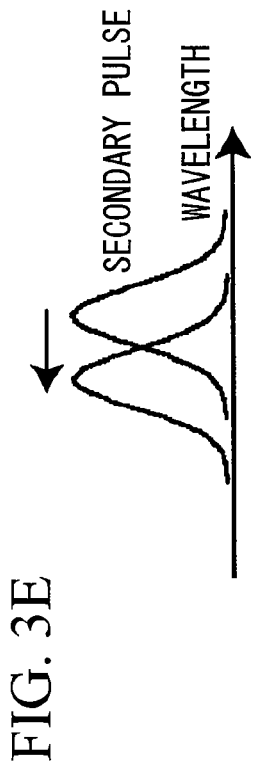
FIG. 3B is a graph diagrammatically showing that the secondary pulse is subjected to spectrum transition in a long-wavelength direction.

Next, cross-phase modulation of the primary pulse and secondary pulse will be described with reference to FIGS. 3A to 3F. In the ring resonator of the second mode-locked laser, the secondary pulse is subjected to mutual phase modulation due to a nonlinear effect caused by the primary pulse. The refractive index of the secondary pulse varies in response to the intensity of the primary pulse. Suppose that, as shown in FIG. 3A, the secondary pulse progresses in time rather than the primary pulse while being partially overlapped with the primary pulse. In this condition, the secondary pulse is subjected to variations of the refractive index, which increase in time, in response to the intensity of the primary pulse that increases in time, thus causing phase modulation. As shown in FIG. 3B, a spectrum transition occurs on the secondary pulse in a long-wavelength direction; in other words, the frequency of the secondary pulse decreases.

Figure 3C:
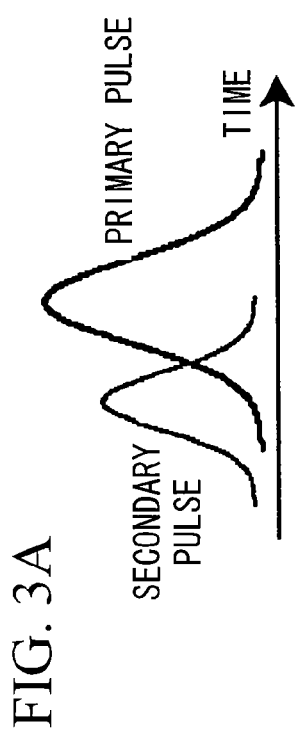
FIG. 3C is a graph diagrammatically showing that the secondary pulse after circulation moves closer to the primary pulse in time.

When a group delay dispersion in the ring resonator of the second mode-locked laser is set to a negative value, the time required for the secondary pulse to circulate through the ring resonator becomes longer due to the spectrum transition in the long-wavelength direction. Since the repetition frequency of the first optical pulse train generated by the first mode-locked laser is substantially identical to the repetition frequency of the second optical pulse train generated by the second mode-locked laser, the secondary pulse circulating through the ring resonator overlaps in time with the primary pulse, which is introduced in the next cycle. In that case, the condition in which the secondary pulse progress in time rather than the primary pulse is released because the circulating time of the secondary pulse becomes longer; hence, as shown in FIG. 3C, it is possible to reduce the time difference between the primary pulse and the secondary pulse.

Figure 3D:
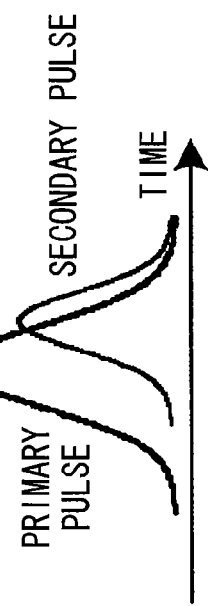
FIG. 3D is a graph diagrammatically showing that the secondary pulse delays in time from the primary pulse while partially overlapping with the primary pulse.
Figure 3E:
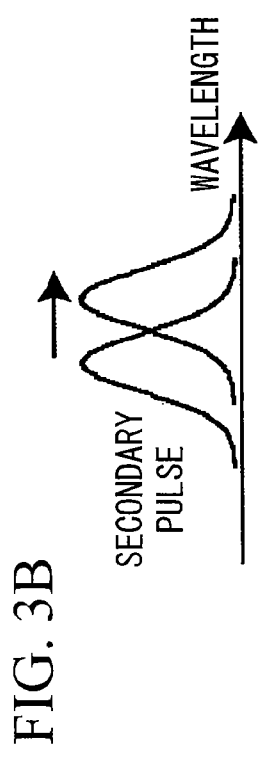
FIG. 3E is a graph diagrammatically showing that the secondary pulse is subjected to spectrum transition in a short-wavelength direction.
Figure 3F:
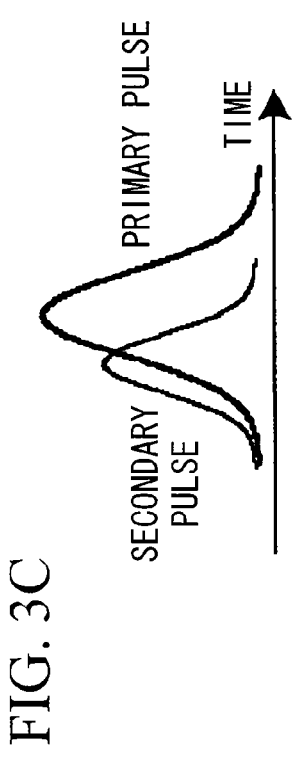
FIG. 3F is a graph diagrammatically showing that the secondary pulse after circulation moves closer to the primary pulse in time.

Suppose that, as shown in FIG. 3D, the secondary pulse delays in time from the primary pulse. In this condition, the secondary pulse is subjected to variations of the refractive index, which decreases in time, in response to the intensity of the primary pulse that decreases in time, thus causing phase modulation. Thus, as shown in FIG. 3E, the secondary pulse is subjected to spectrum transition in a short-wavelength direction; in other words, the frequency of the secondary pulse increases. That is, the condition in which the secondary pulse delays in time from the primary pulse is released because the circulating time of the secondary pulse decreases; thus, as shown in FIG. 3F, it is possible to reduce the time difference between the primary pulse and the secondary pulse.

The aforementioned "passive" mechanism repeatedly works so as to maintain the condition in which the first optical pulse train and the second optical pulse train partially overlap each other in time, whereby the repetition frequency of the second optical pulse train is synchronized with the repetition frequency of the first optical pulse train. Then, the second optical pulse train whose repetition frequency is synchronized with the repetition frequency of the first optical pulse train is output from the output coupler 17 and is then subjected to long-distance transfer toward a remote place via a single mode fiber (or a dispersion-shift fiber) 31. The second optical pulse train, which is output from the fiber terminal at the remote place, is converted into electric signals by means of an optical detector 32 and is thus used to realize the reference clock.

2. Second Embodiment

Next, a clock transfer device according to a second embodiment of the present invention will be described with reference to FIGS. 4 and 5, wherein parts identical to those shown in FIG. 2 are designated by the same reference numerals; hence, the detailed description thereof is omitted as necessary.

Figure 4:
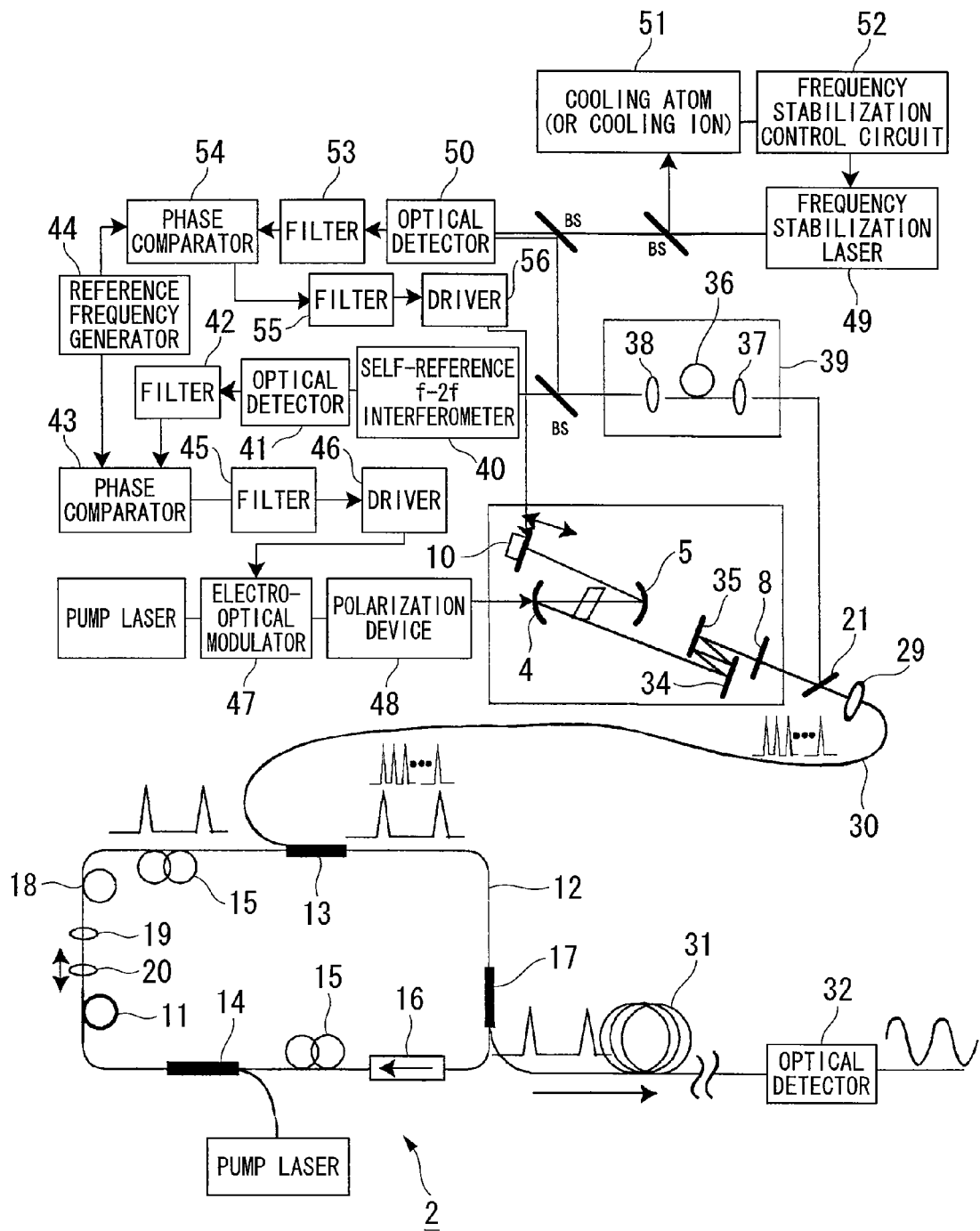
FIG. 4 is a system diagram showing the constitution of a clock transfer device in accordance with a second embodiment of the present invention.

In FIG. 4, an 800 nm wavelength titanium-sapphire laser 33 serves as the first mode-locked laser, and the aforementioned 1.5 μm wavelength erbium fiber laser 2 serves as the second mode-locked laser. The constitution of the first mode-locked laser used in the second embodiment is substantially identical to the constitution of the chrome-forsterite laser 1 used in the first embodiment, whereas dispersion compensating mirrors 34 and 35 are used to perform dispersion compensation due to multiple reflection. Herein, the resonator length is appropriately determined so as to set the repetition frequency to 1 GHz.

The first optical pulse train output from the output mirror 8 is divided by the beam splitter 21 so that the prescribed part thereof is introduced into a broadband device 39 including a photonic crystal fiber 36 and a pair of lenses 37 and 38, in which it is subjected to broadband operation so that the spectrum thereof is increased by one octave or more, i.e., the high-frequency component thereof matches the double of the low-frequency component. The prescribed part of the first optical pulse train subjected to broadband operation is introduced into a self-reference f-2f interferometer 40, in which the incident light is divided into a low-frequency component and a high-frequency component; the low-frequency component is doubled using a nonlinear crystal; the time delay is subjected to compensation; the low-frequency component is mixed with the high-frequency component; then, the same component of the polarized light is extracted, thus producing an interference signal. An optical detector 41 detects the interference signal.

It is possible to establish the relationship between the longitudinal-mode frequency fn (Hz), repetition frequency fr (Hz), and offset frequency fo (Hz) in accordance with an equation (3) where n is an integer designating a longitudinal-mode.

$$fn = fo + n\,fr \quad (3)$$

Figure 5:
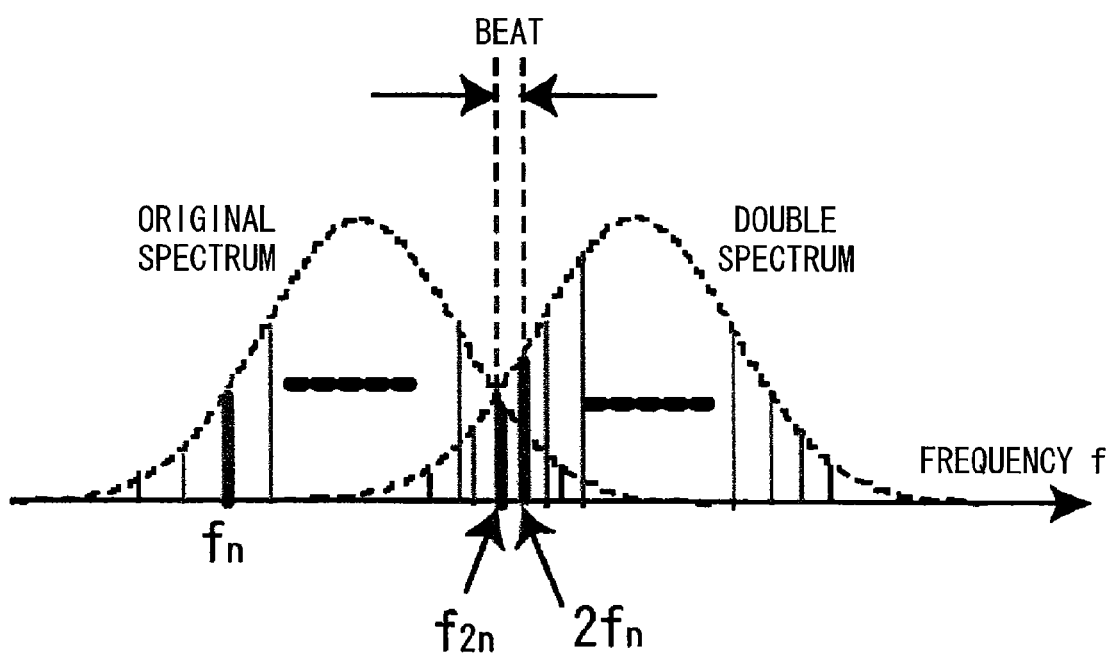
FIG. 5 is a graph for explaining that a frequency difference between a double frequency and a longitudinal-mode frequency of a high-frequency component substantially matches an offset frequency.

As shown in FIG. 5, the double of the longitudinal-mode frequency fn designated by the integer n (regarding the low-frequency component) is given by an equation (4).

$$2fn = 2fo + 2n\,fr \quad (4)$$

The most proximate longitudinal-mode thereof in the high-frequency component is given by an equation (5).

$$f2n = fo + 2n\,fr \quad (5)$$

The two components of light cause a beat frequency corresponding to the difference therebetween, and the beat frequency is given by an equation (6) so as to substantially match the offset frequency.

$$fb = 2fn - f2n = fo \quad (6)$$

A filter 42 extracts a beat signal having the beat frequency (corresponding to the offset frequency) from the interference signal detected by the optical detector 41. A phase comparator 43 compares the beat frequency with a reference frequency generated by a reference frequency generator 44 so as to produce an error signal. The error signal is fed back to an electro-optical modulator 47 via a filter 45 and a driver 46. Then, the laser transmittance is adjusted by means of the electro-optical modulator 47 and a polarization device 48, thus allowing the offset frequency to be appropriately controlled. That is, the offset frequency is synchronized with the reference frequency by way of the feedback control.

In order to lock the offset frequency at zero, an acousto-optic modulator (not shown) is applied to one line of the self-reference f-2f interferometer 40. When a sine wave signal having the reference frequency is applied to the acousto-optic modulator, the optical frequency is shifted by the reference frequency. As a result, the beat frequency is further added with the shift frequency (realized by the acousto-optic modulator) in addition to the offset frequency. By establishing synchronization between the beat frequency and the reference frequency (applied to the acousto-optic modulator), it is possible to lock the offset frequency at zero. Due to the aforementioned mechanism, it is possible to stabilize the longitudinal-mode offset frequency of the first mode-locked laser.

The remaining of the first optical pulse train subjected to broadband operation is mixed with the output of a frequency stabilization laser 49 and is then supplied to an optical detector 50, in which a beat frequency is detected between the longitudinal-mode frequency of the first optical pulse train subjected to broadband operation and the output frequency of the frequency stabilization laser 49. A prescribed part of the output beam of the frequency stabilization laser 49 is supplied to cooling atoms (or cooling ions) 51, which are cooled at a low temperature by way of atomic trapping, whereby a frequency stabilization control circuit 52 performs frequency stabilization such that the optical frequency resonates to the transition frequency of the cooling atoms 51. The optical detector 50 outputs a beat signal to a filter 53, which in turn extracts a beat frequency component therefrom. A phase comparator 54 compares the beat frequency component with the reference frequency generated by the reference frequency generator 44, thus producing an error signal. The error signal is fed back to the piezoelectric element 10 attached to the mirror 3 via a filter 55 and a driver 56. Due to the feedback, the frequency difference between the longitudinal-mode frequency of the first mode-locked laser and the output frequency of the frequency stabilization laser 49 is controlled to substantially match the reference frequency.

In order to lock the frequency difference at zero, in other words, in order to make the longitudinal-mode frequency perfectly match the output frequency of the frequency stabilization laser 49, it is necessary to additionally introduce an acousto-optic modulator into the frequency stabilization control circuit 52 similar to the self-reference f-2f interferometer 40. When the integer n is determined from the equation (3) due to the controlling realized by the acousto-optic modulator, it is possible to stabilize the repetition frequency. Since the integer n can be precisely set to a certain value due to the initial condition, the precision for fixing the repetition frequency directly depends upon the precision for fixing the output frequency of the frequency stabilization laser 49; hence, it is possible to produce the pulse train, which is stabilized at a high precision and which is applied to the reference clock.

Similar to the first embodiment, the remaining of the first optical pulse train having the repetition frequency of 1 GHz output from the first mode-locked laser is introduced into the resonator of the second mode-locked laser. Herein, due to the same mechanism as the first embodiment, passive synchronization occurs on the repetition frequency, whereas, in the second embodiment in which the repetition frequency of the second mode-locked laser is set in advance to 50 MHz while the first optical pulse train of the first mode-locked laser has the repetition frequency of 1 GHz, every time twenty optical pulses belonging to the first optical pulse train are introduced into the clock transfer device, they meet optical pulses belonging to the second optical pulse train. That is, the repetition frequency of the second optical pulse train is synchronized with one-twentieth of the "stabilized" repetition frequency of the first optical pulse train. The details of the second mode-locked laser adapted to the second embodiment are identical to those of the second mode-locked laser adapted to the first embodiment; hence, the detailed description thereof is omitted.

3. Third Embodiment

Next, a clock transfer device according to a third embodiment will be described with reference to FIG. 6.

Figure 6:
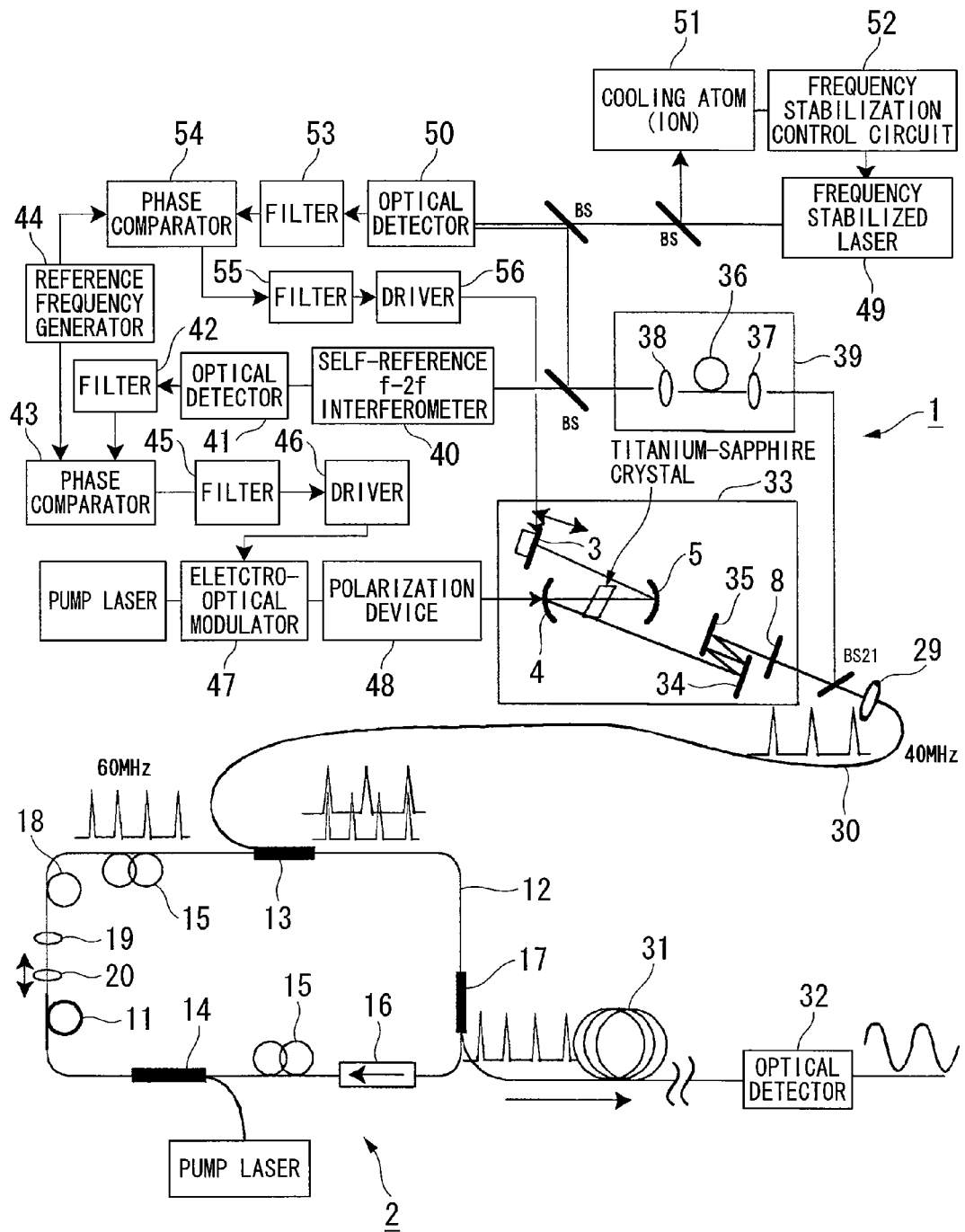
FIG. 6 is a system diagram showing the constitution of a clock transfer device in accordance with a third embodiment of the present invention.

In FIG. 6, the repetition frequency of the first optical pulse train output from the first mode-locked laser is set to 40 MHz, and the repetition frequency of the second optical pulse train output from the second mode-locked laser is set to 60 MHz. Herein, every two optical pulses belonging to the first optical pulse train meet every three optical pulses belonging to the second optical pulse train at the same timing in the resonator of the second mode-locked laser. In addition, the triple of the repetition frequency (i.e., 40 MHz) of the first optical pulse train (where M=3) is synchronized with the double of the repetition frequency (i.e., 60 MHz) of the second optical pulse train (where N=2) at the same value, i.e., 120 MHz.

4. Fourth Embodiment

Figure 7:
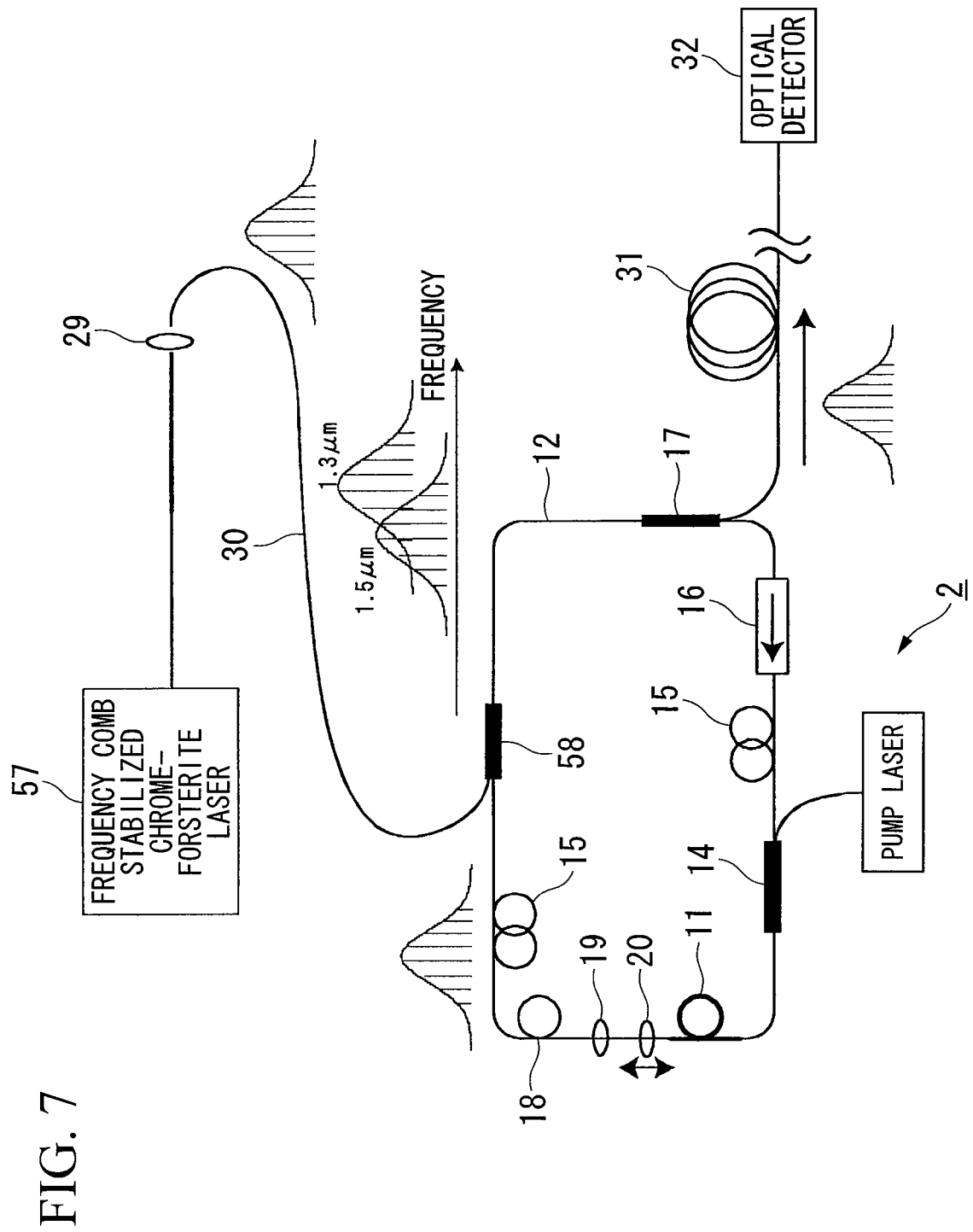
FIG. 7 is a system diagram showing the constitution of a clock transfer device in accordance with a fourth embodiment of the present invention.

Next, a clock transfer device according to a fourth embodiment of the present invention will be described with reference to FIG. 7.

The overall constitution of the clock transfer device of the fourth embodiment is basically identical to the overall constitution of the clock transfer device of the second embodiment shown in FIG. 4 except for the first mode-locked laser. Instead of the titanium-sapphire laser 33 used in the first mode-locked laser shown in FIG. 4, the fourth embodiment uses a frequency comb stabilized chrome-forsterite laser 57 shown in FIG. 7, in which both of the repetition frequency and the offset frequency are stabilized. In addition, a broadband reflection mirror is adapted to the frequency comb stabilized chrome-forsterite laser 57 so as to realize an oscillation wavelength of 1.5 µm. Both of the repetition frequencies of the first and second mode-locked lasers are set to 50 MHz.

In the fourth embodiment, both of the offset frequency and the repetition frequency of the first mode-locked laser are stabilized at a high precision; hence, all of the longitudinal-mode frequencies of the frequency comb are stabilized. The first optical pulse train output from the first mode-locked laser is introduced into the second mode-locked laser via an input coupler 58. Due to the passive synchronization mechanism (which is described in the first embodiment), the repetition frequency of the second optical pulse train output from the second mode-locked laser is synchronized with the repetition frequency of the first optical pulse train output from the first mode-locked laser. Since the first optical pulse train of the first mode-locked laser includes a 1.5 μm wavelength component, the frequency comb of the second optical pulse train may partially overlap the frequency comb of the first optical pulse train in terms of spectrum. For this reason, the second mode-locked laser is synchronized with the longitudinal-mode of the frequency comb of the first mode-locked laser, so that the longitudinal-mode frequency of the frequency comb of the second mode-locked laser is passively synchronized with the longitudinal-mode frequency of the frequency comb of the first mode-locked laser. As a result, the frequency comb of the first mode-locked laser, which is stabilized at a high precision, is transferred to the frequency comb of the second mode-locked laser, thus allowing a long-distance transfer of the frequency comb at a high precision.

5. Fifth Embodiment

Figure 8:
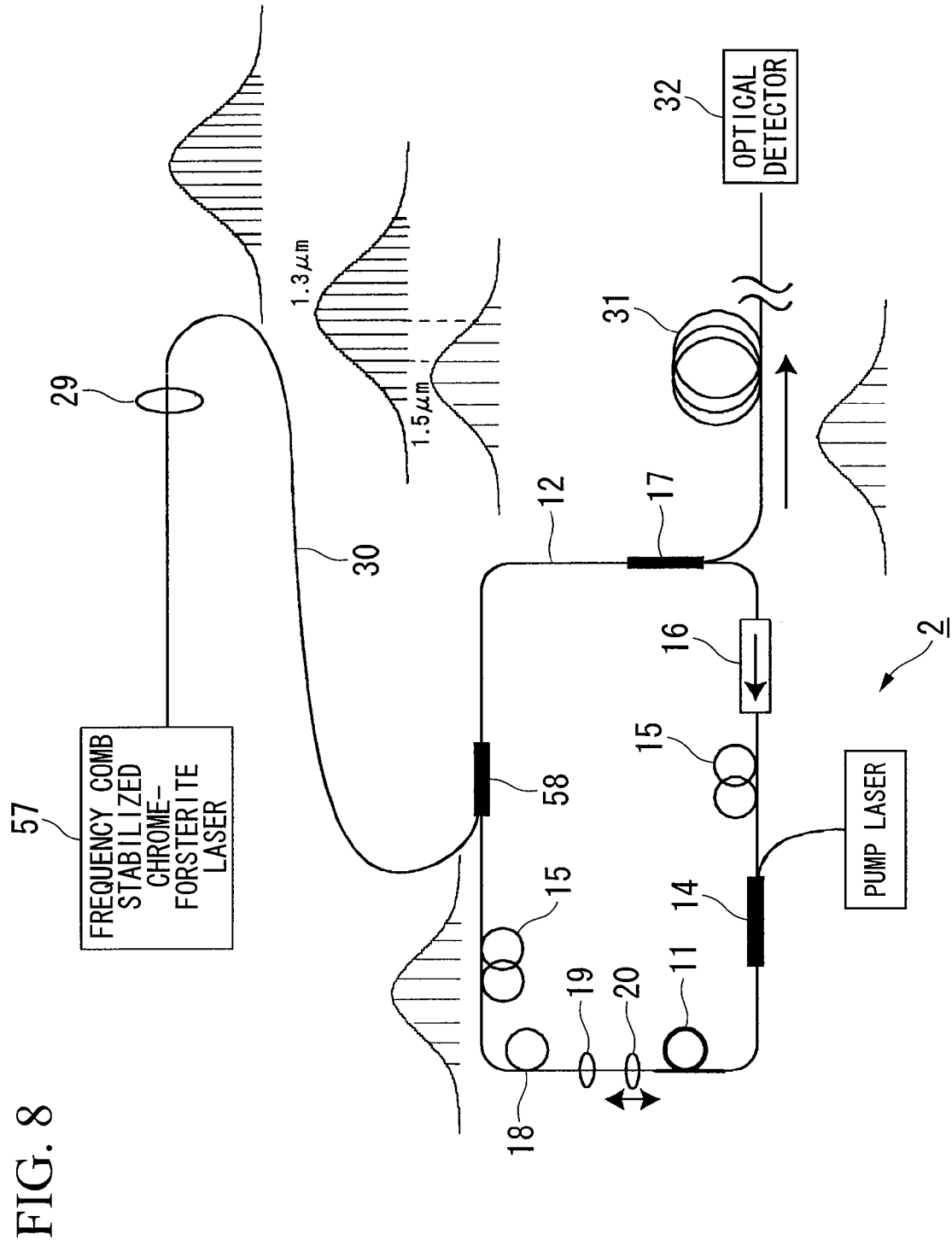
FIG. 8 is a system diagram showing the constitution of a clock transfer device in accordance with a fifth embodiment of the present invention.

Next, a clock transfer device according to a fifth embodiment of the present invention will be described with reference to FIG. 8.

The overall constitution of the clock transfer device of the fifth embodiment is basically identical to the overall constitution of the clock transfer device of the second embodiment shown in FIG. 4 except for the first mode-locked laser. Instead of the titanium-sapphire laser 33 shown in FIG. 4, the fifth embodiment uses the frequency comb stabilized chrome-forsterite laser 57 in which both of the repetition frequency and the offset frequency are stabilized. Herein, the repetition frequency of the first optical pulse train output from the first mode-locked laser is set to 40 MHz, and the repetition frequency of the second optical pulse train output from the second mode-locked laser is set to 60 MHz. In the fifth embodiment, two optical pulses belonging to the first optical pulse train meet three optical pulses belonging to the second optical pulse train at the same timing, thus establishing synchronization due to the passive synchronization mechanism (which is described in the first embodiment). That is, the triple of the repetition frequency of the first optical pulse train (where M=3) is identical to the double of the repetition frequency of the second optical pulse train (where N=2).

As a result, the triple of the longitudinal-mode interval (corresponding to the repetition frequency) of the frequency comb of the first mode-locked laser becomes identical to the double of the longitudinal-mode interval (corresponding to the repetition frequency) of the frequency comb of the second mode-locked laser. Since the frequency comb of the first mode-locked laser may partially overlap the frequency comb of the second mode-locked laser in terms of wavelength, two longitudinal-mode frequencies of the frequency comb of the second mode-locked laser become identical to three longitudinal-mode frequencies of the frequency comb of the first mode-locked laser. In other words, the three longitudinal-mode frequencies of the frequency comb of the first mode-locked laser (where M=3) are transferred to the two longitudinal-mode frequencies of the frequency comb of the second mode-locked laser (where N=2). Since the longitudinal-mode interval of the frequency comb equals the repetition frequency, the difference between every two longitudinal-mode frequencies of the frequency comb of the second mode-locked laser is automatically stabilized.

6. Sixth Embodiment

Figure 9:
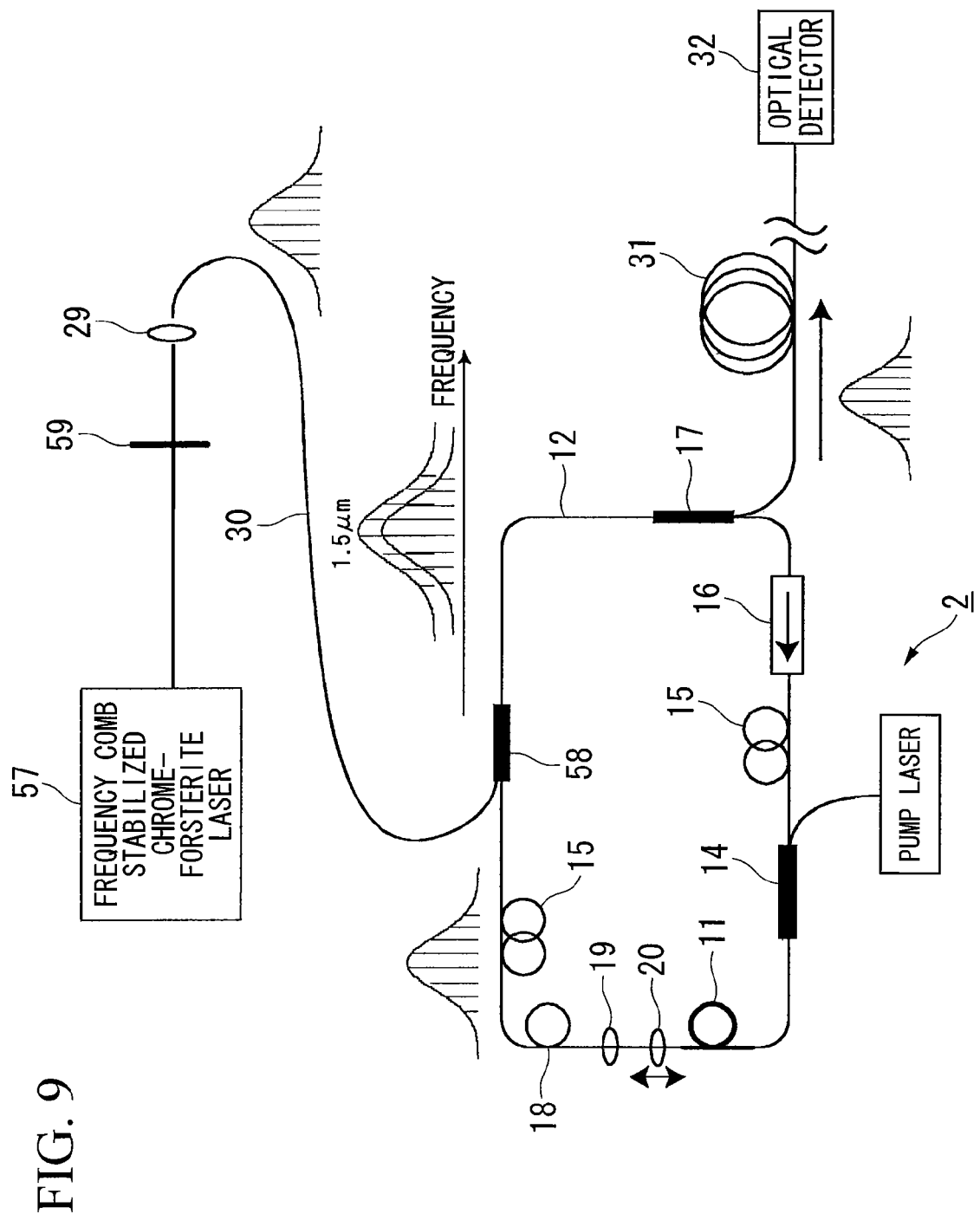
FIG. 9 is a system diagram showing the constitution of a clock transfer device in accordance with a sixth embodiment of the present invention.

Next, a clock transfer device according to a sixth embodiment of the present invention will be described with reference to FIG. 9.

The overall constitution of the clock transfer device of the sixth embodiment is basically identical to the overall constitution of the clock transfer device of the second embodiment shown in FIG. 4 except for the first mode-locked laser. Instead of the titanium-sapphire laser 33, the sixth embodiment uses the frequency comb stabilized chrome-forsterite laser 57 in which both of the repetition frequency and the offset frequency are stabilized. Herein, a wavelength filter 59 is inserted prior to the resonator of the second mode-locked laser, into which the first optical pulse train output from the first mode-locked laser is introduced, so as to perform wavelength processing, in which a prescribed wavelength component caused by the oscillation of the second mode-locked laser is extracted, or wavelength components corresponding to the center of the gain of the first mode-locked laser are removed. That is, the first optical pulse train output from the frequency comb stabilized chrome-forsterite laser 57 is subjected to the aforementioned wavelength processing and is then introduced into the second mode-locked laser. Thus, it is possible to prevent other wavelength components, other than the oscillated wavelength component of the second mode-locked laser, from disturbing the synchronization of the frequency comb.

7. Seventh Embodiment

Figure 10:
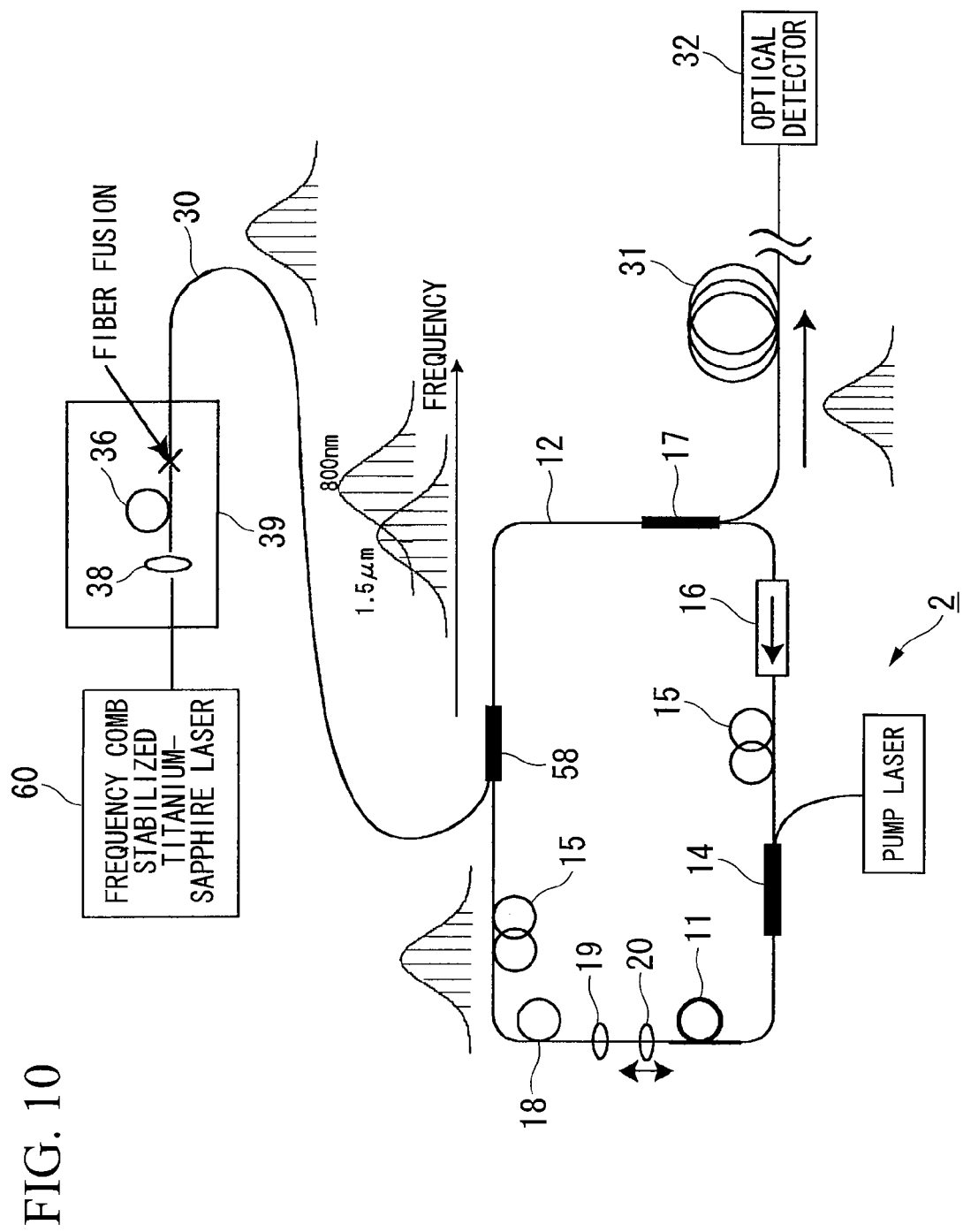
FIG. 10 is a system diagram showing the constitution of a clock transfer device in accordance with a seventh embodiment of the present invention.

Next, a clock transfer device according to a seventh embodiment of the present invention will be described with reference to FIG. 10.

The overall constitution of the clock transfer device of the seventh embodiment is basically identical to the overall constitution of the clock transfer deice of the second embodiment shown in FIG. 4 except for the first mode-locked laser. The seventh embodiment uses a frequency comb stabilized titanium-sapphire laser 60, wherein both of the repetition frequencies of the first and second optical pulse trains are set to 50 MHz. A wavelength broadening device 36 including a photonic crystal fiber (or a high nonlinear fiber) 36 is arranged prior to the single mode fiber 30 for introducing the first optical pulse train into the second mode-locked laser, thus broadening the spectrum of the first mode-locked laser up to the 1.5 μm wavelength range. As described in the second embodiment, both of the offset frequency and the repetition frequency are stabilized in the first mode-locked laser; hence, all of the longitudinal-mode frequencies of the frequency comb are stabilized. Since a broadband operation is performed by way of four-wave mixing, it is possible to maintain the offset frequency and the longitudinal-mode interval (corresponding to the repetition frequency) of the frequency comb whose wavelength range is broadened up to the 1.5 μm wavelength range. Thus, the first optical pulse train output from the first mode-locked laser is subjected to the aforementioned broadband operation and is then introduced into the second mode-locked laser via the input coupler 58.

Due to the passive synchronization mechanism (which is described in the first embodiment), the repetition frequency of the second optical pulse train of the second mode-locked laser is synchronized with the repetition frequency of the first optical pulse train of the first mode-locked laser. In the seventh embodiment, the first optical pulse train includes the 1.5 μm wavelength component; hence, the frequency comb caused by the oscillation of the second mode-locked laser may partially overlap the frequency comb of the first mode-locked laser in terms of spectrum. Thus, the second optical pulse train of the second mode-locked laser is synchronized with the longitudinal-mode frequency of the frequency comb of the first mode-locked laser, so that the longitudinal-mode frequency of the frequency comb of the second mode-locked laser is passively synchronized with the longitudinal-mode frequency of the frequency comb of the first mode-locked laser. As a result, the frequency comb of the first mode-locked laser, which is stabilized at a high precision, is transferred to the frequency comb of the second mode-locked laser, thus allowing long-distance transfer of the frequency comb at a high precision.

8. Eighth Embodiment

Figure 11:
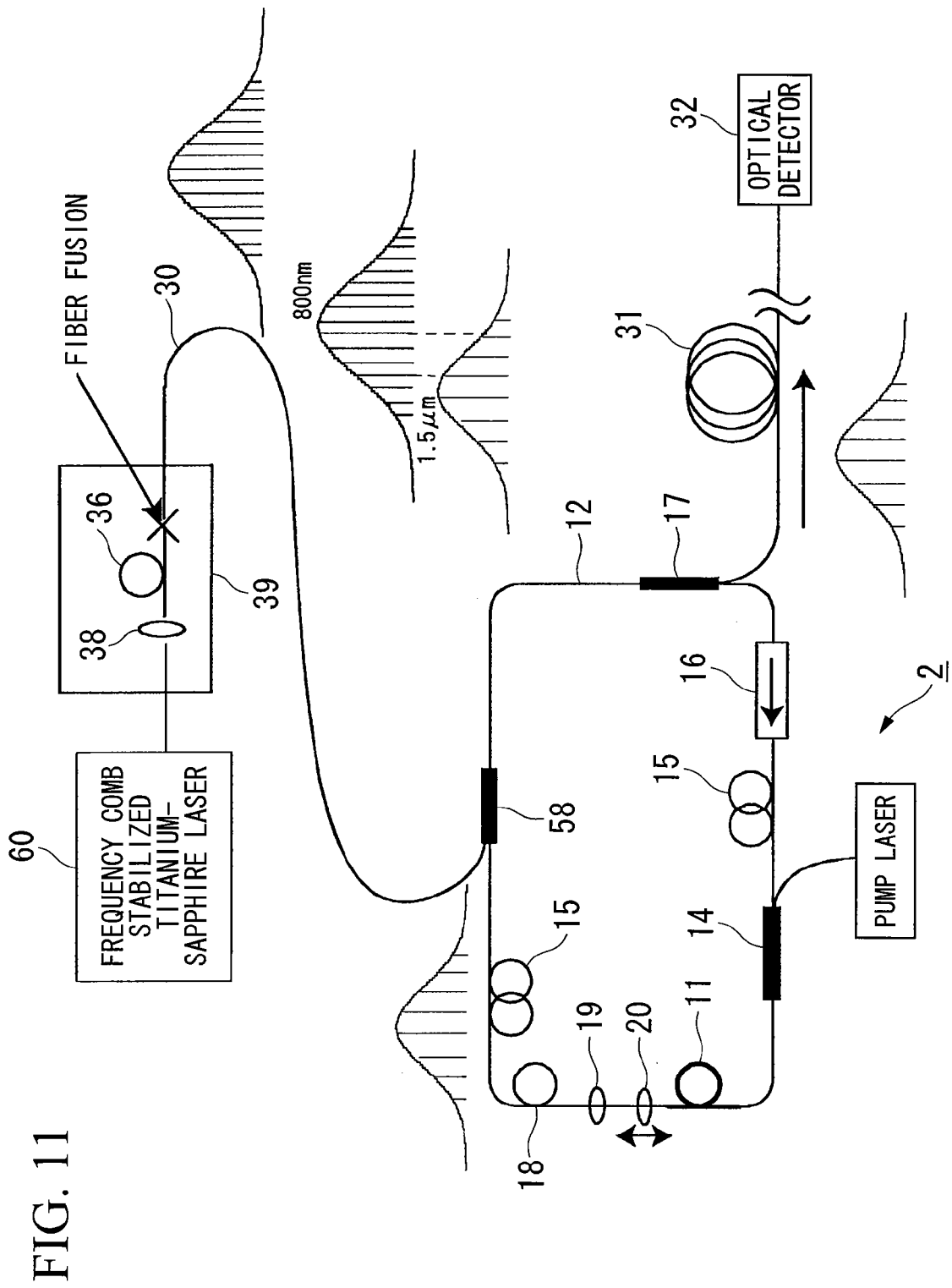
FIG. 11 is a system diagram showing the constitution of a clock transfer device in accordance with an eighth embodiment of the present invention.

Next, a clock transfer device according to an eighth embodiment of the present invention will be described with reference to FIG. 11.

The overall constitution of the clock transfer device of the eighth embodiment is basically identical to the overall constitution of the clock transfer device of the second embodiment shown in FIG. 4 except for the first mode-locked laser. Similar to the seventh embodiment, the eighth embodiment uses the frequency comb stabilized titanium-sapphire laser 60 and the wavelength broadening device 39 including the photonic crystal fiber 36, wherein the resonator lengths are appropriately designed such that the repetition frequency of the first mode-locked laser is set to 40 MHz, and the repetition frequency of the second mode-locked laser is set to 60 MHz. Due to the aforementioned mechanism described in the fifth embodiment, two longitudinal-mode frequencies of the frequency comb of the second mode-locked laser meet three longitudinal-mode frequencies of the frequency comb of the first mode-locked laser, whereby the three longitudinal-mode frequencies of the frequency comb of the first mode-locked laser (where M=3) are transferred to the two longitudinal-mode frequencies of the frequency comb of the second mode-locked laser. Since the longitudinal-mode interval of the frequency comb is identical to the repetition frequency, the difference between the two longitudinal-mode frequencies of the frequency comb of the second mode-locked laser is automatically stabilized.

9. Ninth Embodiment

Figure 12:
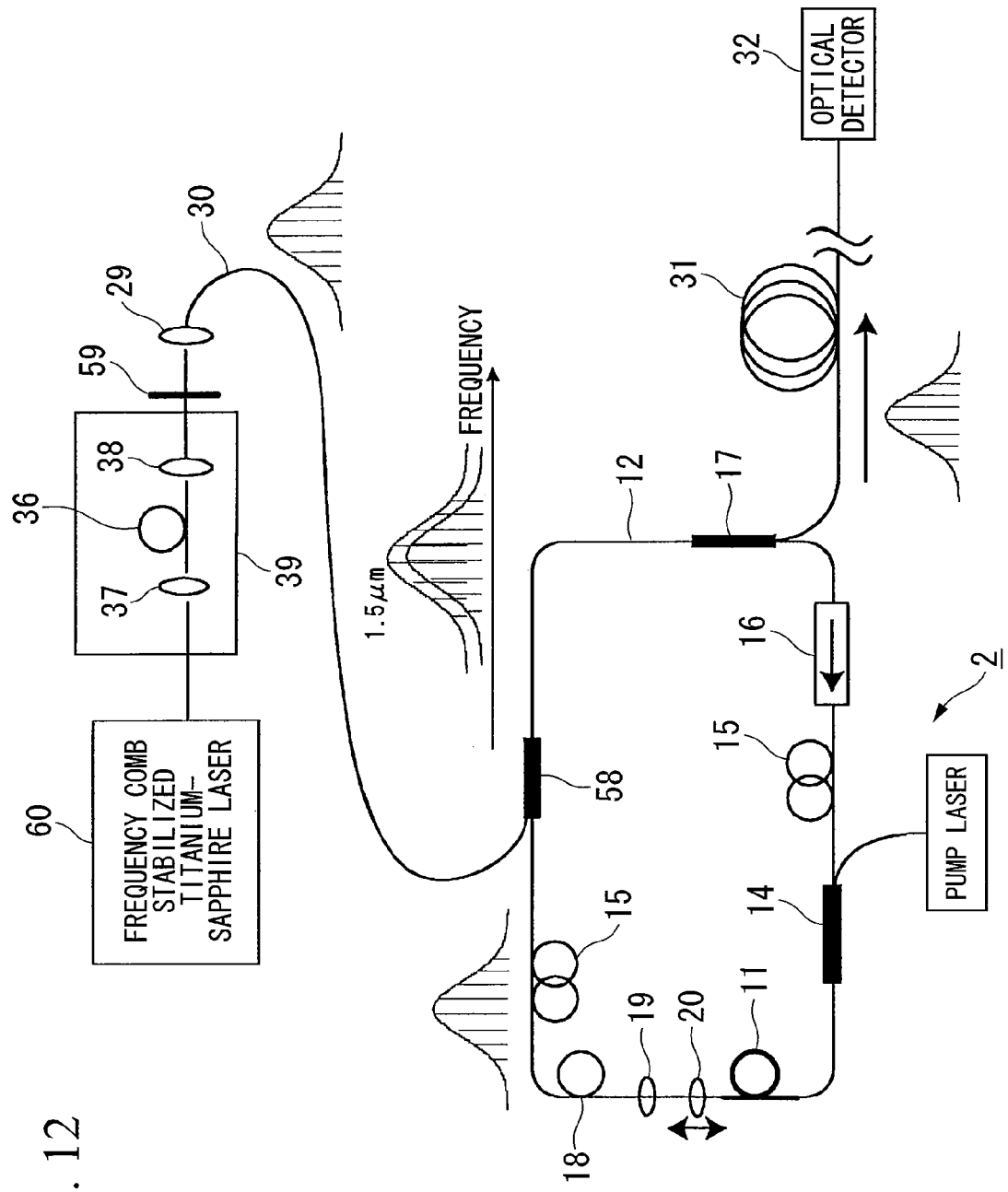
FIG. 12 is a system diagram showing the constitution of a clock transfer device in accordance with a ninth embodiment of the present invention.

Next, a clock transfer device according to a ninth embodiment of the present invention will be described with reference to FIG. 12.

The clock transfer device of the ninth embodiment is characterized in that the first optical pulse train, which is output from the first mode-locked laser via the wavelength broadening device 39, is supplied to the resonator of the second mode-locked laser via the wavelength filter 59, the lens 29, and the single mode fiber 30. That is, the first optical pulse train is subjected to wavelength processing, in which the wavelength component caused by the oscillation of the second mode-locked laser is extracted and in which the wavelength component corresponding to the center of the gain of the first mode-locked laser is removed, and is then supplied to the second mode-locked laser. Thus, it is possible to prevent other wavelength components, other than the oscillated wavelength component of the second mode-locked laser, from disturbing the synchronization of the frequency comb of the second mode-locked laser.

10. Tenth Embodiment

Next, a clock transfer device according to a tenth embodiment of the present invention will be described with reference to FIG. 13.

Figure 13:
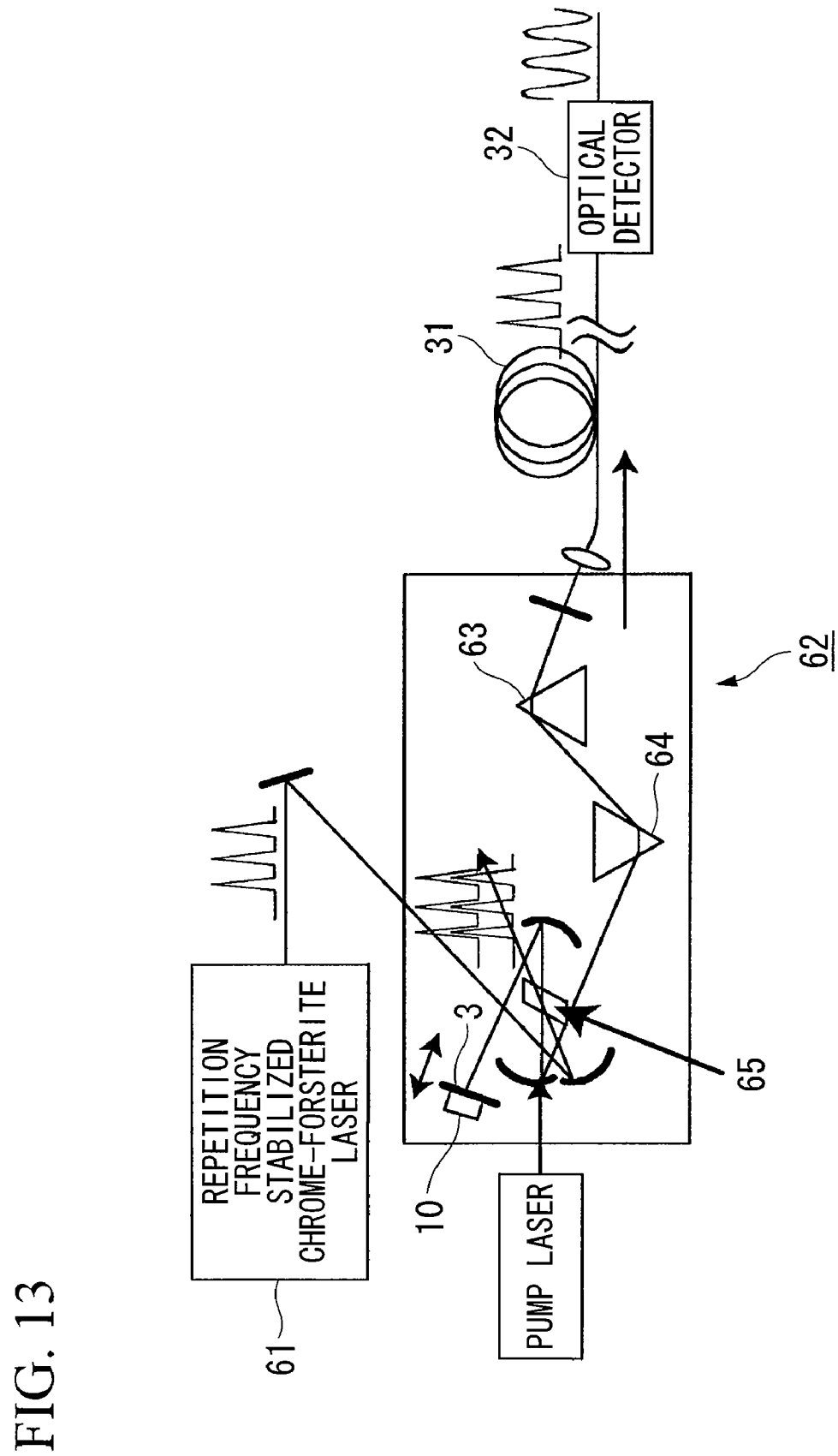
FIG. 13 is a system diagram showing the constitution of a clock transfer device in accordance with a tenth embodiment of the present invention.

The overall constitution of the clock transfer device of the tenth embodiment is similar to the overall constitution of the clock transfer device of the first embodiment shown in FIG. 2, whereas, in FIG. 13, a repetition frequency stabilized chrome-forsterite laser 61 serves as the first mode-locked laser, and a 1.5 µm wavelength erbium-ytterbium glass laser 62 serves as the second mode-locked laser. A pair of prisms 63 and 64 is installed in the resonator of the second mode-locked laser so as to perform dispersion compensation, thus setting the group delay dispersion of the resonator to a negative value. The mirror 3 included in the resonator of the second mode-locked laser is mounted on a moving stage (not shown) and is attached with the piezoelectric element 10, thus realizing approximate adjustment or fine adjustment with respect to the resonator length. The first optical pulse train output from the first mode-locked laser is introduced into a laser medium (e.g., a erbium-ytterbium glass) 65 so as to coaxially cross the optical path of the resonator. The aforementioned passive synchronization mechanism (which is described in the first embodiment) occurs in the laser medium 65, so that the repetition frequency of the second mode-locked laser is synchronized with the repetition frequency of the first mode-locked laser.

11. Eleventh Embodiment

Next, a clock transfer device according to an eleventh embodiment of the present invention will be described with reference to FIG. 14.

Figure 14:
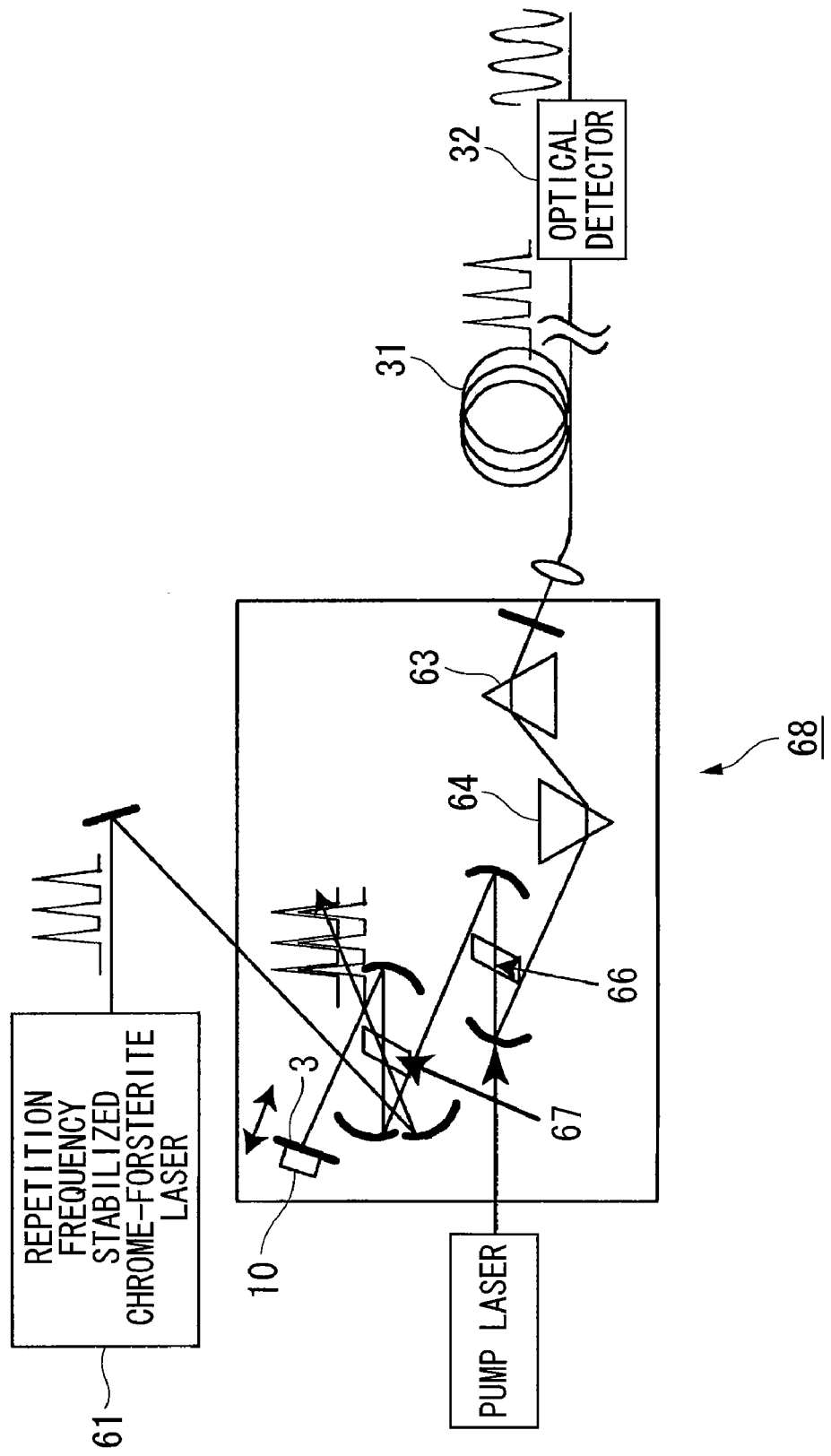
FIG. 14 is a system diagram showing the constitution of a clock transfer device in accordance with an eleventh embodiment of the present invention.

The overall constitution of the clock transfer device of the eleventh embodiment is basically similar to the overall constitution of the clock transfer device of the first embodiment shown in FIG. 2, whereas, in FIG. 14, the repetition frequency stabilized chrome-forsterite laser 61 serves as the first mode-locked laser, and a 1.5 µm chrome-YAG laser 68 serves as the second mode-locked laser. A pair of the prisms 63 and 64 are installed in the resonator of the second mode-locked laser, thus setting the group delay dispersion of the resonator to a negative value. In the eleventh embodiment, a laser medium 66 and another medium 67 are installed in the resonator of the second mode-locked laser. The first optical pulse train output from the first mode-locked laser is introduced into the medium 67 so as to coaxially cross the optical path of the resonator. Due to the aforementioned passive synchronization mechanism (which is described in the first embodiment), the repetition frequency of the second mode-locked laser is passively synchronized with the repetition frequency of the first mode-locked laser.

12. Twelfth Embodiment

Next, a clock transfer device according to a twelfth embodiment of the present invention will be described with reference to FIG. 15.

Figure 15:
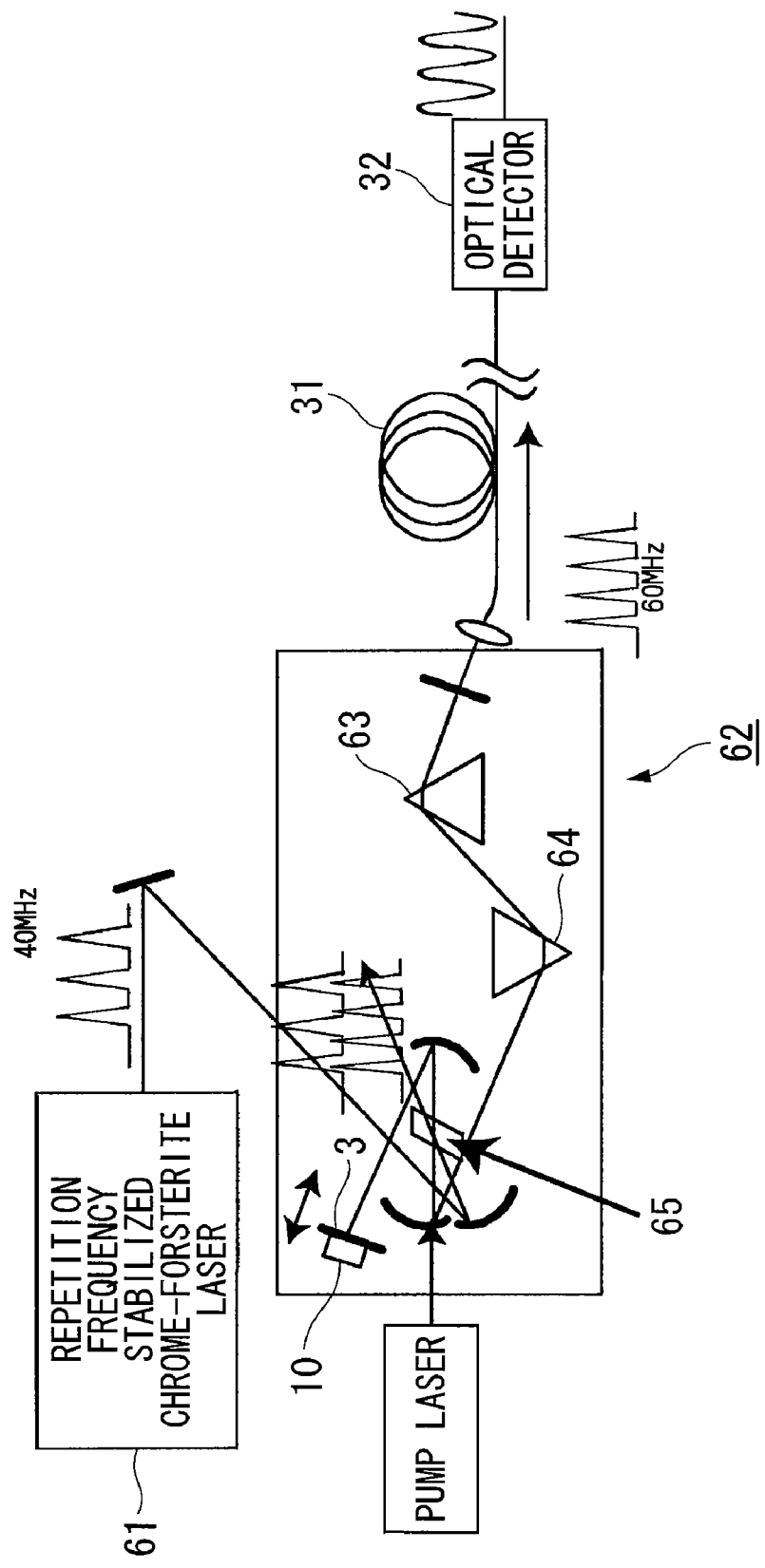
FIG. 15 is a system diagram showing the constitution of a clock transfer device in accordance with an twelfth embodiment of the present invention.

The overall constitution of the clock transfer device of the twelfth embodiment is basically similar to the overall constitution of the clock transfer device of the tenth embodiment shown in FIG. 13, whereas, in FIG. 15, the repetition frequency of first optical pulse train of the first mode-locked laser is set to 40 MHz, and the repetition frequency of the second optical pulse train of the second mode-locked laser is set to 60 MHz. Herein, two optical pulses belonging to the first optical pulse train of the first mode-locked laser meet three optical pulses belonging to the second optical pulse train of the second mode-locked laser at the same timing in the laser medium 65 of the resonator of the second mode-locked laser, thus realizing passive synchronization. At this time, the triple of the repetition frequency (i.e., 40 MHz) of the first optical pulse train (where M=3) becomes identical to the double of the repetition frequency (i.e., 60 MHz) of the second optical pulse train (where N=2), i.e., 120 MHz.

13. Thirteenth Embodiment

Next, a clock transfer device according to a thirteenth embodiment of the present invention will be described with reference to FIG. 16.

Figure 16:
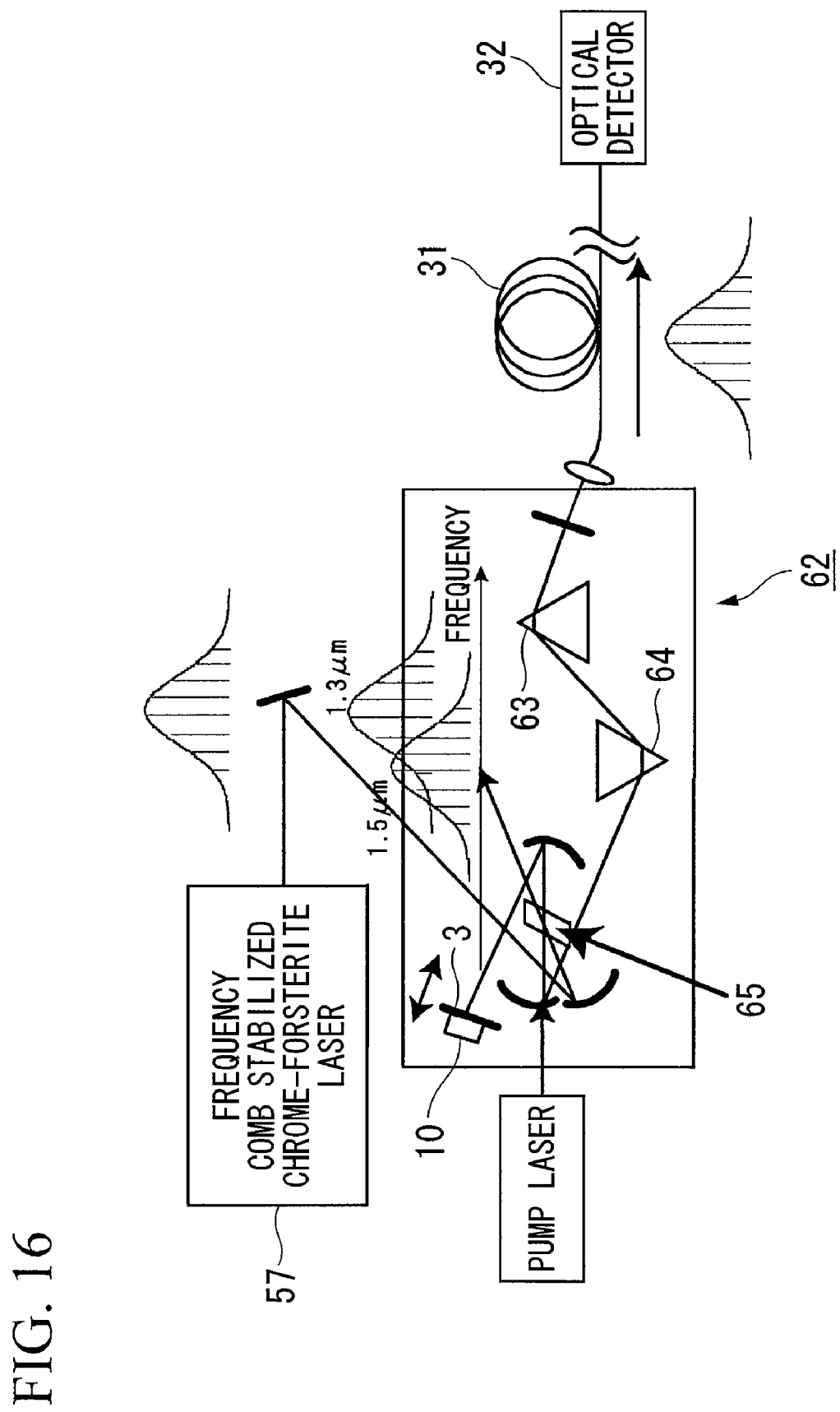
FIG. 16 is a system diagram showing the constitution of a clock transfer device in accordance with a thirteenth embodiment of the present invention.

The overall constitution of the clock transfer device of the thirteenth embodiment is basically similar to the overall constitution of the clock transfer device of the tenth embodiment shown in FIG. 13, whereas, in FIG. 16, the frequency comb stabilized chrome-forsterite laser 57, in which both of the repetition frequency and the offset frequency are stabilized, serves as the first mode-locked laser. A broadband reflection mirror is applied to the first mode-locked laser so that the oscillated wavelength of the first mode-locked laser overlaps the oscillated wavelength (i.e., 1.5 μm) of the second mode-locked laser. In addition, the resonator lengths of the first and second mode-locked lasers are determined such that the repetition frequency of the first optical pulse train becomes identical to the repetition frequency of the second optical pulse train. The first optical pulse train output from the first mode-locked laser is introduced into the laser medium (i.e., erbium-ytterbium glass) 65. Due to the passive synchronization mechanism (which is described in the first embodiment), the repetition frequency of the second optical pulse train of the second mode-locked laser is synchronized with the repetition frequency of the first optical pulse train of the first mode-locked laser. In the thirteenth embodiment, the frequency comb of the second mode-locked laser partially overlaps the frequency comb of the first mode-locked laser in terms of spectrum; hence, due to the nonlinear interaction in the laser medium 65, the longitudinal-mode frequency of the frequency comb of the second mode-locked laser is passively synchronized with the longitudinal-mode frequency of the frequency comb of the first mode-locked laser. As a result, the frequency comb of the first mode-locked laser is transferred to the frequency comb of the second mode-locked laser.

14. Fourteenth Embodiment

Next, a clock transfer device according to a fourteenth embodiment of the present invention will be described with reference to FIG. 17.

Figure 17:
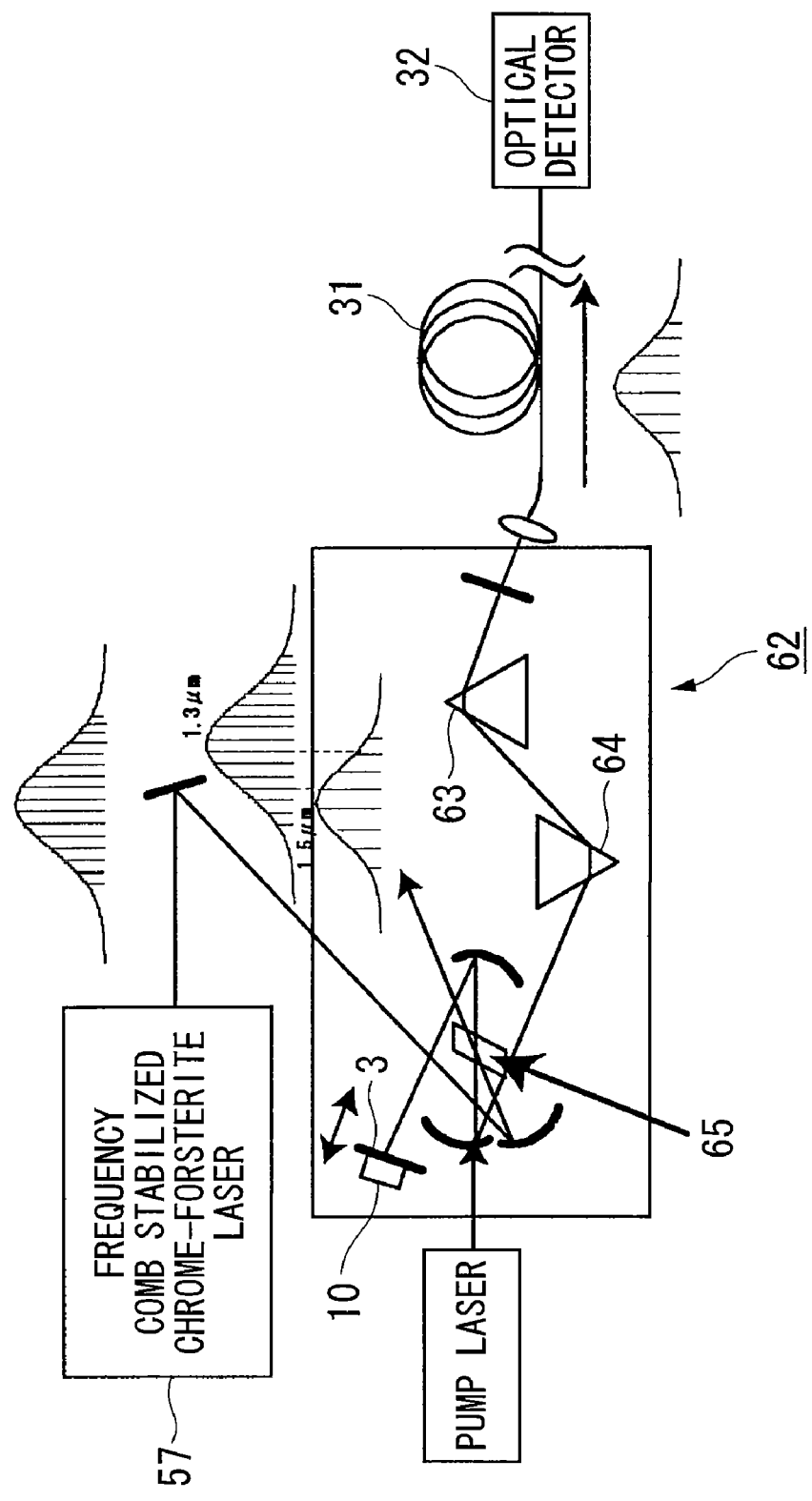
FIG. 17 is a system diagram showing the constitution of a clock transfer device in accordance with a fourteenth embodiment of the present invention.

The overall constitution of the clock transfer device of the fourteenth embodiment is basically similar to the overall constitution of the clock transfer device of the thirteenth embodiment shown in FIG. 16, whereas, in FIG. 17, the repetition frequency of the first optical pulse train of the first mode-locked laser is set to 40 MHz, and the repetition frequency of the second optical pulse train of the second mode-locked laser is set to 60 MHz. Herein, two optical pulses belonging to the first optical pulse train meet three optical pulses belonging to the second optical pulse train at the same timing, thus establishing synchronization therebetween due to the aforementioned passive synchronization mechanism (which is described in the first embodiment). That is, the triple of the repetition frequency of the first optical pulse train (where M=3) becomes identical to the double of the repetition frequency of the second optical pulse train (where N=2). As a result, the triple of the longitudinal-mode interval (corresponding to the repetition frequency) of the frequency comb of the first mode-locked laser becomes identical to the double of the longitudinal-mode interval (corresponding to the repetition frequency) of the frequency comb of the second mode-locked laser.

Since the frequency comb of the first mode-locked laser partially overlaps the frequency comb of the second mode-locked laser in terms of the wavelength, two longitudinal-mode frequencies of the frequency comb of the second mode-locked laser match three longitudinal-mode frequencies of the frequency comb of the first mode-locked laser. In other words, three longitudinal-mode frequencies of the frequency comb of the first mode-locked laser (where M=3) are transferred to two longitudinal-mode frequencies of the frequency comb of the second mode-locked laser (where N=2). Since the longitudinal-mode interval of the frequency comb is identical to the repetition frequency, the difference between two longitudinal-mode frequencies of the frequency comb of the second mode-locked laser is automatically stabilized.

15. Fifteenth Embodiment

Next, a clock transfer device according to a fifteenth embodiment of the present invention will be described with reference to FIG. 18.

Figure 18:
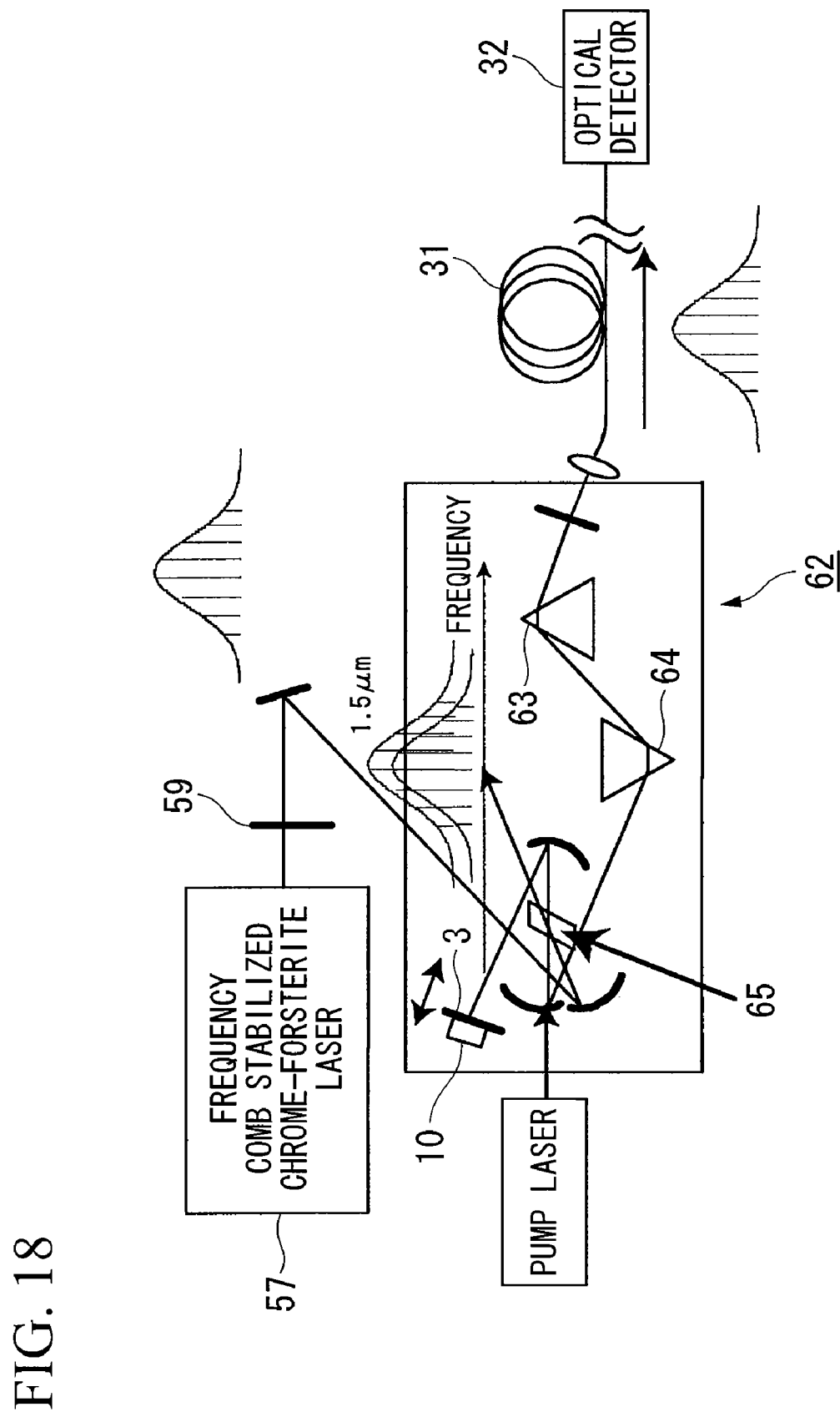
FIG. 18 is a system diagram showing the constitution of a clock transfer device in accordance with a fifteenth embodiment of the present invention.

The overall constitution of the clock transfer device of the fifteenth embodiment is basically similar to the overall constitution of the clock transfer device of the thirteenth embodiment shown in FIG. 16, whereas, in FIG. 18, the wavelength filter 59 is arranged between the first mode-locked laser and the second mode-locked laser. That is, the wavelength filter 59 performs wavelength processing such that only the oscillated wavelength component of the second mode-locked laser is extracted, or the prescribed component corresponding to the center of the gain of the first mode-locked laser is removed; then, the first optical pulse train subjected to the wavelength processing is introduced into the second mode-locked laser via the wavelength filter 59. Thus, it is possible to prevent other components, other than the oscillated wavelength component of the second mode-locked laser, from disturbing the synchronization of the frequency comb.

16. Sixteenth Embodiment

Next, a clock transfer device according to a sixteenth embodiment of the present invention will be described with reference to FIG. 19.

In the sixteenth embodiment, the frequency comb stabilized titanium-sapphire laser 60, in which both of the repetition frequency and the offset frequency are stabilized, serves as the first mode-locked laser. In addition, both of the repetition frequencies of the first and second optical pulse trains are set to 50 MHz. The first optical pulse train output from the first mode-locked laser is supplied to the wavelength broadening device 39 including the photonic crystal fiber (or high nonlinear fiber) 36 and is thus subjected to a spectrum broadening operation in which the spectrum thereof partially overlaps the oscillated wavelength (i.e. 1.5 μm) of the second mode-locked laser. It is previously described in the second embodiment that all the longitudinal-mode frequencies of the frequency comb are stabilized because both of the offset frequency and the repetition frequency of the first mode-locked laser are stabilized at a high precision. Since the broadening operation is performed by way of the four-wave mixing, it is possible to maintain the offset frequency and the longitudinal-mode interval of the frequency comb whose wavelength is broadened up to 1.5 μm. Thus, the first optical pulse train of the first mode-locked laser is subjected to the wavelength broadening operation and is then introduced into the laser medium (i.e., erbium-ytterbium glass) 65 in the resonator second mode-locked laser.

Due to the passive synchronization mechanism (which is described in the first embodiment), the repetition frequency of the second optical pulse train is synchronized with the repetition frequency of the first optical pulse train. In the sixteenth embodiment, the first optical pulse train including the 1.5 μm wavelength component is introduced into the second mode-locked laser; hence, the frequency comb caused by the oscillation of the second mode-locked laser may partially overlap the frequency comb of the first mode-locked laser in terms of spectrum. The second mode-locked laser forms the frequency comb in synchronization with the longitudinal-mode frequency of the frequency comb of the first mode-locked laser, whereby the longitudinal-mode frequency of the frequency comb of the second mode-locked laser is passively synchronized with the longitudinal-mode frequency of the frequency comb of the first mode-locked laser. As a result, the frequency comb of the first mode-locked laser, which is stabilized at a high precision, is transferred to the frequency comb of the second mode-locked laser. This realizes the long-distance transfer of the frequency comb at a high precision.

17. Seventeenth Embodiment

Next, a clock transfer device according to a seventeenth embodiment of the present invention will be described with reference to FIG. 20.

Figure 19:
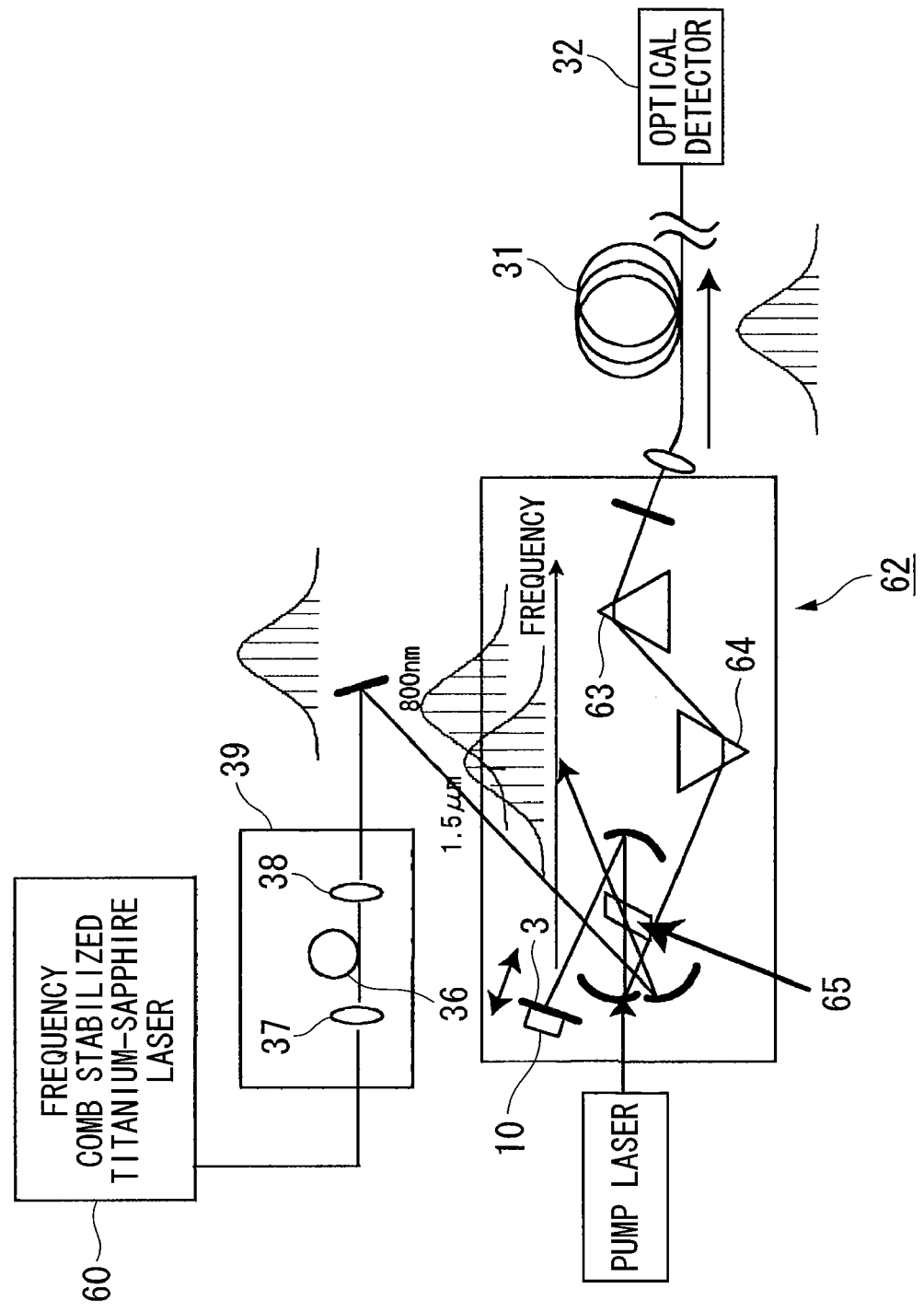
FIG. 19 is a system diagram showing the constitution of a clock transfer device in accordance with a sixteenth embodiment of the present invention.
Figure 20:
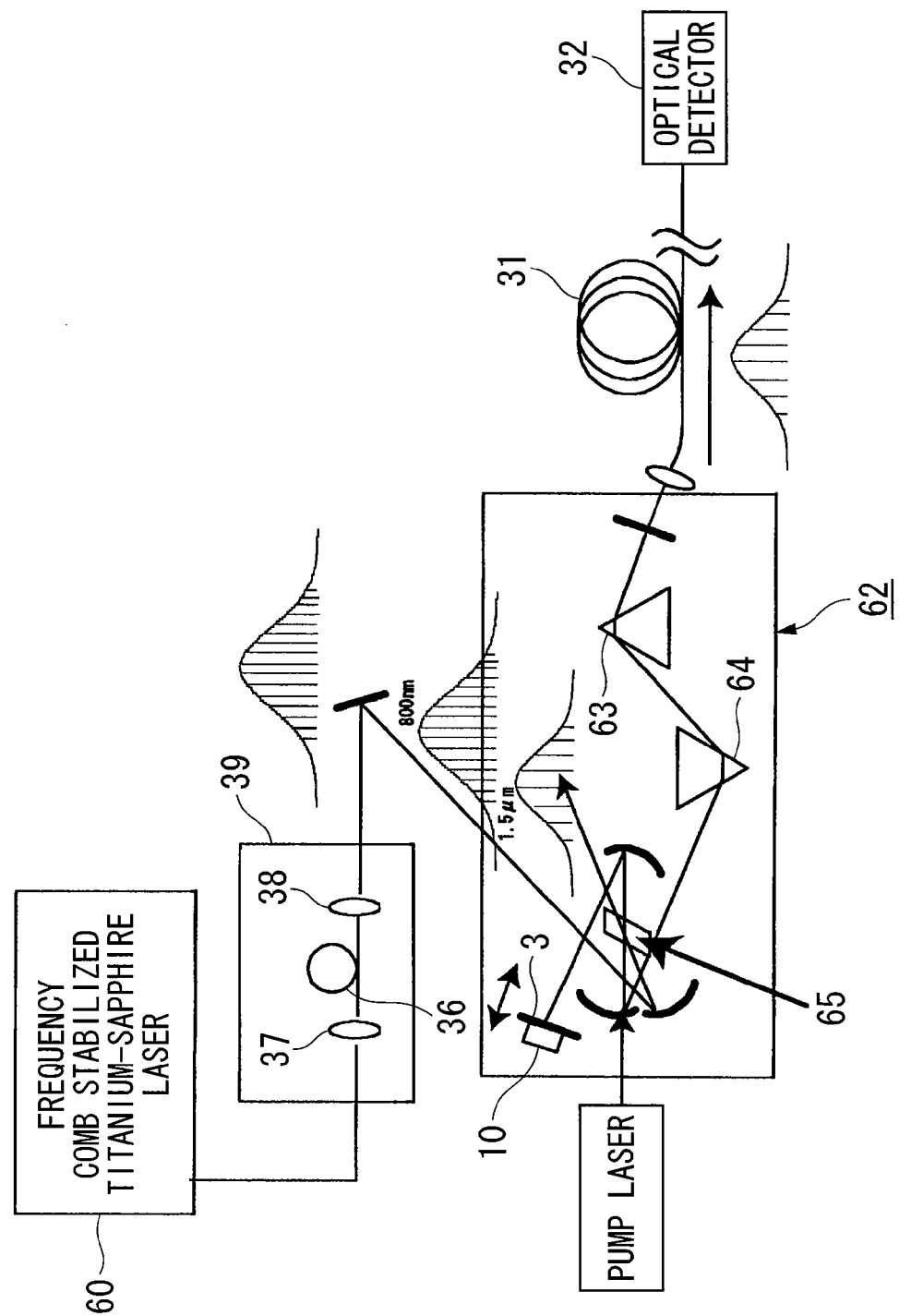
FIG. 20 is a system diagram showing the constitution of a clock transfer device in accordance with a seventeenth embodiment of the present invention.

The overall constitution of the clock transfer device of the seventeenth embodiment is basically similar to the overall constitution of the clock transfer device of the sixteenth embodiment shown in FIG. 19, whereas, in FIG. 20, the repetition frequency of the first optical pulse train is set to 40 MHz, and the repetition frequency of the second optical pulse train is set to 60 MHz. Herein, two optical pulses belonging to the first optical pulse train meet three optical pulses belonging to the second optical pulse train at the same timing, thus realizing the passive synchronization mechanism (which is described in the first embodiment). That is, the triple of the repetition frequency of the first optical pulse train (where M=3) becomes identical to the double of the repetition frequency of the second optical pulse train (where N=2). As a result, the triple of the longitudinal-mode interval (corresponding to the repetition frequency) of the frequency comb of the first mode-locked laser matches the double of the longitudinal-mode interval (corresponding to the repetition frequency) of the frequency comb of the second mode-locked laser.

Since the frequency comb of the first mode-locked laser partially overlaps the frequency comb of the second mode-locked laser in terms of the wavelength range, the second mode-locked laser forms the frequency comb thereof in such a way that two longitudinal-mode frequencies thereof match three longitudinal-mode frequencies of the frequency comb of the first mode-locked laser. That is, three longitudinal-mode frequencies of the frequency comb of the first mode-locked laser (where M=3) are transferred to two longitudinal-mode frequencies of the frequency comb of the second mode-locked laser (where N=2). Since the longitudinal-mode interval of the frequency comb corresponds to the repetition frequency, the difference between two longitudinal-mode frequencies of the frequency comb of the second mode-locked laser is automatically stabilized.

18. Eighteenth Embodiment

Next, a clock transfer device according to an eighteenth embodiment of the present invention will be described with reference to FIG. 21.

Figure 21:
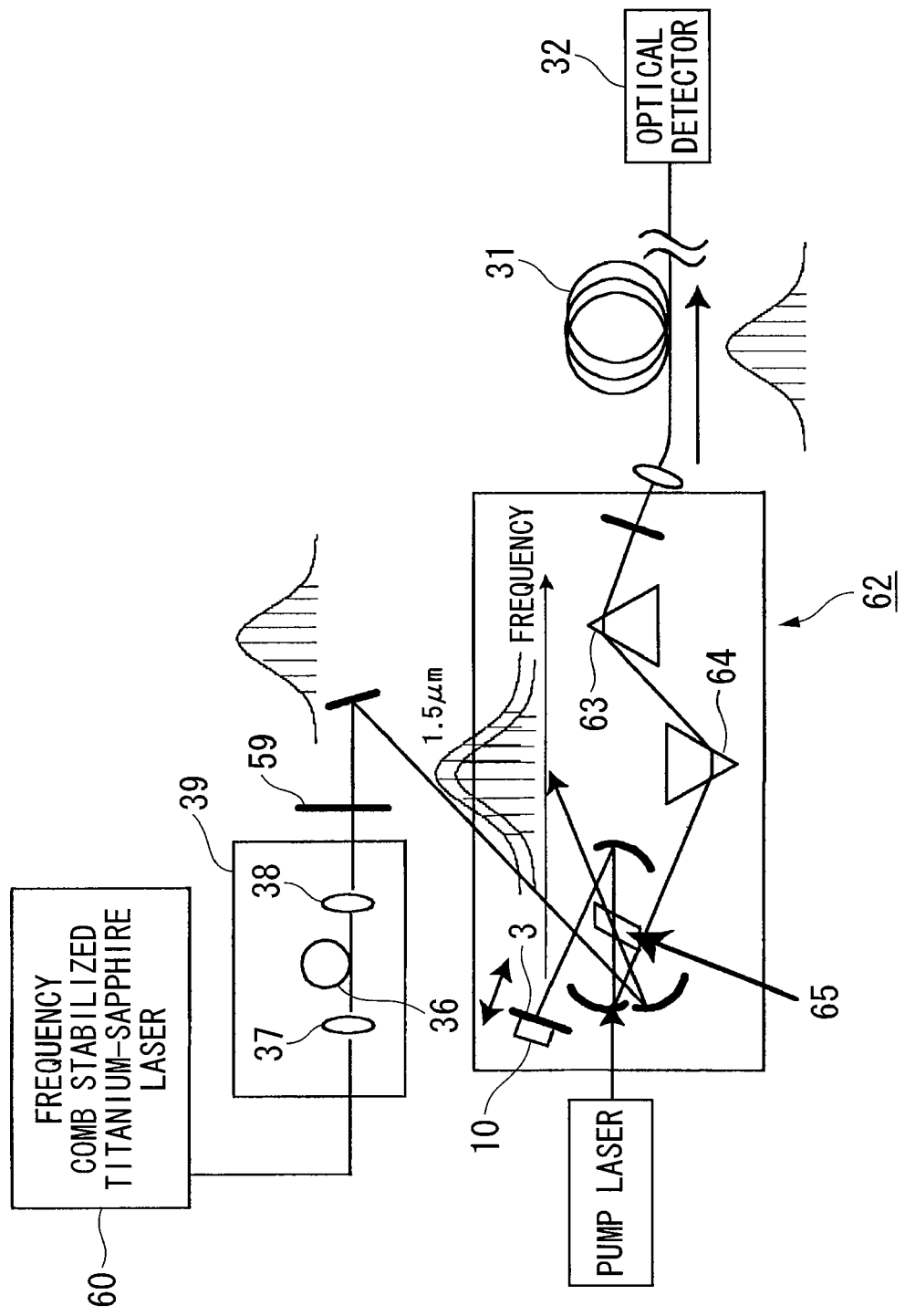
FIG. 21 is a system diagram showing the constitution of a clock transfer device in accordance with an eighteenth embodiment of the present invention.

The overall constitution of the clock transfer device of the eighteenth embodiment is basically similar to the overall constitution of the clock transfer device of the sixteenth embodiment shown in FIG. 19, whereas, in FIG. 21, the first optical pulse train of the first mode-locked laser is introduced into the laser medium 65 included in the resonator of the second mode-locked laser via the wavelength filter 59, which performs wavelength processing such that only the oscillated wavelength component of the second mode-locked laser is extracted, or the prescribed component corresponding to the center of the gain of the first mode-locked laser is removed. That is, the first optical pulse train is subjected to the wavelength processing and is then introduced into the second mode-locked laser. Thus, it is possible to prevent other components, other than the oscillated wavelength component of the second mode-locked laser, from disturbing the synchronization of the frequency comb.

Lastly, the present invention is not necessarily limited to the aforementioned embodiments; hence, it can be further modified in a variety of ways within the scope of the invention defined by the appended claims.

What is claimed is:

1. A clock transfer device comprising:
   a first mode-locked laser for generating a first optical pulse train having a first repetition frequency and a first wavelength;
   a second mode-locked laser for generating a second optical pulse train having a second repetition frequency and a second wavelength;
   an optical introduction means for introducing the first optical pulse train into a resonator of the second mode-locked laser; and
   an optical transmission means for transmitting the second optical pulse train output from the second mode-locked laser,
   wherein the second repetition frequency is passively synchronized with the first repetition frequency due to a negative value of a group delay dispersion of a resonator of the second mode-locked laser.

2. A clock transfer device comprising:
   a first mode-locked laser for generating a first optical pulse train having a first repetition frequency and a first wavelength;
   a second mode-locked laser for generating a second optical pulse train having a second repetition frequency and a second wavelength;
   an optical introduction means for introducing the first optical pulse train into a resonator of the second mode-locked laser; and
   an optical transmission means for transmitting the second optical pulse train output from the second mode-locked laser,
   wherein an N multiple (where N is an integer) of the second repetition frequency is passively synchronized with an M multiple (where M is an integer) of the first repetition frequency due to a negative value of a group delay dispersion of a resonator of the second mode-locked laser.

3. A clock transfer device comprising:
- a first mode-locked laser for generating a first optical pulse train having a first repetition frequency and a first wavelength range;
- a second mode-locked laser for generating a second optical pulse train having a second repetition frequency and a second wavelength range partially overlapping the first wavelength range;
- an optical introduction means for introducing the second optical pulse train into a resonator of the second mode-locked laser; and
- an optical transmission means for transmitting the second optical pulse train output from the second mode-locked laser,
- wherein a longitudinal-mode frequency of a frequency comb of the second optical pulse train is passively synchronized with a longitudinal-mode frequency of a frequency comb of the first optical pulse train due to a negative value of a group delay dispersion of a resonator of the second mode-locked laser.

4. A clock transfer device according to claim 3, wherein N longitudinal-mode frequencies (where N is an integer) of the frequency comb of the second optical pulse train are each passively synchronized with M longitudinal-mode frequencies (where M is an integer) of the frequency comb of the first optical pulse train.

5. A clock transfer device according to claim 3 further comprising a means for selecting a prescribed component of the first optical pulse train whose wavelength is identical to an oscillated wavelength of the resonator of the second mode-locked laser, wherein the means is arranged between the first mode-locked laser and the optical introduction means.

6. A clock transfer device comprising:
- a first mode-locked laser for generating a first optical pulse train having a first repetition frequency and a first wavelength range;
- a wavelength broadening means for performing a wavelength broadening operation so as to broaden the first wavelength range of the first optical pulse train;
- a second mode-locked laser for generating a second optical pulse train having a second repetition frequency and a second wavelength range;
- an optical introduction means for introducing the first optical pulse train subjected to the wavelength broadening operation into a resonator of the second mode-locked laser; and
- an optical transmission means for transmitting the second optical pulse train output from the second mode-locked laser,
- wherein a longitudinal-mode frequency of a frequency comb of the second optical pulse train is passively synchronized with a longitudinal-mode frequency of a frequency comb of the first optical pulse train due to a negative value of a group delay dispersion of a resonator of the second mode-locked laser.

7. A clock transfer device according to claim 6, wherein N longitudinal-mode frequencies (where N is an integer) of a frequency comb of the second optical pulse train are each passively synchronized with M longitudinal-mode frequencies (where M is an integer) of a frequency comb of the first optical pulse train.

8. A clock transfer device according to claim 6 further comprising a means for selecting a prescribed component of the first optical pulse train whose wavelength is identical to an oscillated wavelength of the resonator of the second mode-locked laser, wherein the means is arranged between the wavelength broadening means and the optical introduction means.

9. A clock transfer device comprising:
- a first mode-locked laser for generating a first optical pulse train having a first repetition frequency and a first wavelength;
- a second mode-locked laser for generating a second optical pulse train having a second repetition frequency and a second wavelength;
- a medium that is arranged in a resonator of the second mode-locked laser and that shares an optical path suited to the first optical pulse train; and
- an optical transmission means for transmitting the second optical pulse train output from the second mode-locked laser,
- wherein the second repetition frequency is passively synchronized with the first repetition frequency due to a negative value of a group delay dispersion of a resonator of the second mode-locked laser.

10. A clock transfer device comprising:
- a first mode-locked laser for generating a first optical pulse train having a first repetition frequency and a first wavelength;
- a second mode-locked laser for generating a second optical pulse train having a second repetition frequency and a second wavelength;
- a medium that is arranged in a resonator of the second mode-locked laser and that shares an optical path suited to the first optical pulse train; and
- an optical transmission means for transmitting the second optical pulse train output from the second mode-locked laser,
- wherein an N multiple (where N is an integer) of the second repetition frequency is passively synchronized with an M multiple (where M is an integer) of the first repetition frequency due to a negative value of a group delay dispersion of the second mode-locked laser.

11. A clock transfer device comprising:
- a first mode-locked laser for generating a first optical pulse train having a first repetition frequency and a first wavelength range;
- a second mode-locked laser for generating a second optical pulse train having a second repetition frequency and a second wavelength range partially overlapping the first wavelength range;
- a medium that is arranged in a resonator of the second mode-locked laser and that shares an optical path suited to the first optical pulse train; and
- an optical transmission means for transmitting the second optical pulse train output from the second mode-locked laser,
- wherein a longitudinal-mode frequency of a frequency comb of the second optical pulse train is passively synchronized with a longitudinal-mode frequency of a frequency comb of the first optical pulse train due to a negative value of a group delay dispersion of the second mode-locked laser.

12. A clock transfer device according to claim 11, wherein N longitudinal-mode frequencies (where N is an integer) of the frequency comb of the second optical pulse train are each passively synchronized with M longitudinal-mode frequencies (where M is an integer) of the frequency comb of the first optical pulse train.

13. A clock transfer device according to claim 11 further comprising a means for selecting a prescribed component of the first optical pulse train whose wavelength is identical to an oscillated wavelength of the resonator of the second mode-locked laser, wherein the means is arranged between the first mode-locked laser and the medium.

14. A clock transfer device comprising:
- a first mode-locked laser for generating a first optical pulse train having a first repetition frequency and a first wavelength range;
- a wavelength broadening means for performing a wavelength broadening operation so as to broaden the first wavelength range;
- a second mode-locked laser for generating a second optical pulse train having a second repetition frequency and a second wavelength range;
- a medium that is arranged in a resonator of the second mode-locked laser and that shares an optical path suited to the first optical pulse train subjected to the wavelength broadening operation; and
- an optical transmission means for transmitting the second optical pulse train output from the second mode-locked laser, wherein a longitudinal-mode frequency of a frequency comb of the second optical pulse train is passively synchronized with a longitudinal-mode frequency of a frequency comb of the first optical pulse train due to a negative value of a group delay dispersion of the second mode-locked laser.

15. A clock transfer device according to claim 14, wherein N longitudinal-mode frequencies (where N is an integer) of the frequency comb of the second optical pulse train are each passively synchronized with M longitudinal-mode frequencies (where M is an integer) of the frequency comb of the first optical pulse train.

16. A clock transfer device according to claim 14 further comprising a means for selecting a prescribed component of the first optical pulse train whose wavelength is identical to an oscillated wavelength of the resonator of the second mode-locked laser, wherein the means is arranged between the wavelength broadening means and the medium.

* * * * *